United States Patent
Garmark et al.

(10) Patent No.: US 10,620,797 B2
(45) Date of Patent: Apr. 14, 2020

(54) SYSTEMS AND METHODS FOR MULTI-CONTEXT MEDIA CONTROL AND PLAYBACK

(71) Applicant: Spotify AB, Stockholm (SE)

(72) Inventors: Sten Garmark, Stockholm (SE); Karl Magnus Röös, Uppsala (SE); Andreas Öman, Stockholm (SE); Per Gunnar Joachim Bengtsson, Kista (SE); Marcus Per Vesterlund, Stockholm (SE)

(73) Assignee: Spotify AB, Stockholm (SE)

( * ) Notice: Subject to any disclaimer, the term of this patent is extended or adjusted under 35 U.S.C. 154(b) by 681 days.

(21) Appl. No.: 13/928,306

(22) Filed: Jun. 26, 2013

(65) Prior Publication Data

US 2014/0006947 A1    Jan. 2, 2014

Related U.S. Application Data

(60) Provisional application No. 61/666,732, filed on Jun. 29, 2012, provisional application No. 61/727,649, (Continued)

(51) Int. Cl.
*G06F 3/0484* (2013.01)
*H04L 29/06* (2006.01)

(52) U.S. Cl.
CPC ........ *G06F 3/0484* (2013.01); *H04L 65/4084* (2013.01)

(58) Field of Classification Search
CPC .................................................. H04N 21/4227
See application file for complete search history.

(56) References Cited

U.S. PATENT DOCUMENTS 7,116,763 B2    10/2006    Sifuentes
7,356,838 B2 *   4/2008    Madison ................. G06F 21/10
                                                                    726/10

(Continued)

FOREIGN PATENT DOCUMENTS

DE      102005033211        1/2007
EP          1845684        10/2007

(Continued)

OTHER PUBLICATIONS

Replay TV 5000 User Manual, 2002.*

(Continued)

*Primary Examiner* — Fernando Alcon
(74) *Attorney, Agent, or Firm* — Morgan, Lewis & Bockius LLP

(57) ABSTRACT

A method for controlling media presentation is disclosed. In some implementations, the method is performed at a first electronic device having one or more processors and memory storing one or more programs for execution by the one or more processors. The first electronic device displays a webpage including a control element, such as a "play" button. The webpage originates from a webpage server. The first electronic device receives a user input, such as a mouse click, selecting the control element. In response to the user input, the first electronic device sends a media control request to a media server. The media control request is configured to cause the media server to control presentation of first media content at a second electronic device associated with the user, wherein the second electronic device is different from the first electronic device, and wherein the media server is different from the webpage server.

33 Claims, 8 Drawing Sheets

Related U.S. Application Data filed on Nov. 16, 2012, provisional application No. 61/767,650, filed on Feb. 21, 2013.

(56) References Cited

U.S. PATENT DOCUMENTS

| | | | |
|---|---|---|---|
| 7,571,014 B1 | 8/2009 | Lambourne et al. | |
| 9,195,383 B2 | 11/2015 | Garmark et al. | |
| 9,204,100 B2* | 12/2015 | White | H04N 7/17318 |
| 9,635,068 B2 | 4/2017 | Garmark et al. | |
| 2001/0001160 A1* | 5/2001 | Shoff | H04N 5/44543 725/51 |
| 2002/0082901 A1 | 6/2002 | Dunning et al. | |
| 2003/0135860 A1* | 7/2003 | Dureau | H04N 21/43615 725/82 |
| 2004/0068756 A1 | 4/2004 | Chiu | |
| 2004/0068766 A1 | 4/2004 | Poulsen et al. | |
| 2004/0133908 A1 | 7/2004 | Smith et al. | |
| 2004/0249815 A1* | 12/2004 | Lee | G06F 21/105 |
| 2005/0028208 A1* | 2/2005 | Ellis | H04N 7/163 725/58 |
| 2005/0251566 A1 | 11/2005 | Weel | |
| 2005/0251576 A1 | 11/2005 | Weel | |
| 2005/0289236 A1 | 12/2005 | Hull et al. | |
| 2006/0026636 A1* | 2/2006 | Stark | H04N 5/44543 725/37 |
| 2006/0248557 A1* | 11/2006 | Stark | H04N 21/4126 725/37 |
| 2007/0217436 A1* | 9/2007 | Markley | H04L 12/2803 370/401 |
| 2008/0040332 A1* | 2/2008 | Lee | H04H 60/66 |
| 2008/0158000 A1 | 7/2008 | Mattrazzo | |
| 2008/0200154 A1 | 8/2008 | Maharajh et al. | |
| 2008/0244681 A1* | 10/2008 | Gossweiler | H04N 21/235 725/133 |
| 2009/0063703 A1 | 3/2009 | Finkelstein et al. | |
| 2009/0138507 A1 | 5/2009 | Burckart et al. | |
| 2009/0172757 A1* | 7/2009 | Aldrey | H04N 7/165 725/110 |
| 2009/0199254 A1 | 8/2009 | White et al. | |
| 2009/0241143 A1* | 9/2009 | White | H04N 7/17318 725/38 |
| 2009/0241149 A1 | 9/2009 | Yoshioka et al. | |
| 2010/0037274 A1 | 2/2010 | Meuninck et al. | |
| 2010/0067378 A1 | 3/2010 | Cohen et al. | |
| 2010/0121891 A1 | 5/2010 | Zampiello | |
| 2010/0121961 A1 | 5/2010 | Elleuch et al. | |
| 2010/0153846 A1 | 6/2010 | Roy | |
| 2010/0262675 A1 | 10/2010 | Meuninck et al. | |
| 2011/0063506 A1* | 3/2011 | Reams | H04N 5/4403 348/553 |
| 2011/0110275 A1 | 5/2011 | Shaheen | |
| 2011/0131332 A1 | 6/2011 | Bouazizi | |
| 2011/0131520 A1 | 6/2011 | Al-Shaykh et al. | |
| 2011/0196973 A1 | 8/2011 | Shaheen et al. | |
| 2011/0219105 A1 | 9/2011 | Kryze et al. | |
| 2012/0023532 A1* | 1/2012 | Wong | H04N 21/4227 725/109 |
| 2012/0029672 A1 | 2/2012 | Hamilton et al. | |
| 2012/0078997 A1 | 3/2012 | Evans et al. | |
| 2012/0084356 A1 | 4/2012 | Ferdi | |
| 2012/0117632 A1 | 5/2012 | Curtis et al. | |
| 2012/0198350 A1 | 8/2012 | Nhiayi | |
| 2013/0034197 A1 | 2/2013 | Aweya et al. | |
| 2014/0006947 A1 | 1/2014 | Garmark et al. | |
| 2014/0214927 A1 | 7/2014 | Garmark et al. | |
| 2014/0215334 A1 | 7/2014 | Garmark et al. | |
| 2014/0282703 A1* | 9/2014 | Garg | H04N 21/814 725/33 |
| 2014/0373077 A1 | 12/2014 | Rumreich | |
| 2015/0003816 A1 | 1/2015 | Clapper | |
| 2015/0026746 A1 | 1/2015 | Fondberg et al. | |
| 2015/0199122 A1 | 7/2015 | Garmark et al. | |
| 2017/0264950 A1* | 9/2017 | Gerhards | H04N 21/4147 |

FOREIGN PATENT DOCUMENTS

| | | |
|---|---|---|
| EP | 2160029 | 3/2010 |
| WO | WO 2007/101182 | 9/2007 |

OTHER PUBLICATIONS

Spotify AB, International Search Report and Written Opinion, PCT/IB2013/001945, dated Dec. 18, 2013, 22 pgs.

Spotify AB, Invitation to Pay Additional Fees, PCT/IB2013/001929, dated Dec. 18, 2013, 8 pgs.

Garmark, Notice of Allowance, U.S. Appl. No. 13/784,704, dated Oct. 13, 2015, 7 pgs.

Spotify AB, International Preliminary Report on Patentablity, PCT/IB2013/001929, dated Dec. 31, 2014, 44 pgs.

Spotify AB, International Preliminary Report on Patentability, PCT/IB2013/001938, dated Dec. 31, 2014, 19 pgs.

Anonymous, Last.fm, en.wikipedia.org/w/index.php?title=Last.fm &oldid=499039710, Jun. 23, 2012, pp. 4, 9.

Katz, Playlist-Based Radio, Post to Tumblr and embeddable Play Buttons Come to Spotify for Windows and Mac OS, Spotify blog, May 11, 2012, 1 pg.

O'Neill, The Complete Guide to YouTube Playlists, Oct. 21, 2010, 1 pg.

Spotify AB, International Search Report and Written Opinion, PCT/IB2013/001929, dated Feb. 26, 2014, 53 pgs.

Spotify AB, International Search Report and Written Opinion, PCT/IB2013/001938, dated Dec. 19, 2013, 23 pgs.

Garmark, Office Action, U.S. Appl. No. 14/950,863, dated May 9, 2016, 6 pgs.

Garmark, Notice of Allowance, U.S. Appl. No. 14/950,863, dated Dec. 23, 2016, 5 pgs.

Garmark, Final Office Action, U.S. Appl. No. 14/411,886, dated Apr. 6, 2017, 18 pgs.

Garmark, Final Office Action, U.S. Appl. No. 14/411,886, dated Oct. 19, 2017, 15 pgs.

Garmark, Office Action, U.S. Appl. No. 15/495,823, dated Aug. 21, 2017, 6 pgs.

Garmark, Notice of Allowance, U.S. Appl. No. 15/495,823, dated Nov. 29, 2017, 5 pgs.

Spotify AB, Communication Pursuant to Article 94(3), EP13766665.7, dated Dec. 1, 2017, 9 pgs.

Garmark, Office Action, U.S. Appl. No. 13/784,704, dated Apr. 7, 2015, 23 pgs.

Spotify AB, International Preliminary Report on Patentability, PCT/IB2013/001945, dated Jan. 8, 2015, 19 pgs.

Communication Pursuant to Rule 161(2) and 162 EPC, EP13766665.7, dated Feb. 17, 2015, 2 pgs.

Garmark, Office Action, U.S. Appl. No. 14/411,886, dated Mar. 29, 2018, 17 pgs.

Spotify AB, Extended European Search Report, EP17204527.0, dated Mar. 8, 2018, 11 pgs.

Sujeet Mate et al., "Movable-multimedia: Session Mobility in Ubiquitous Computing Ecosystem," 5th International Conference on Mobile and Ubiquitous Multimedia: MUM 2006, Dec. 4-6, 2006, Stanford, California, USA, 5 pgs.

Garmark, Final Office Action, U.S. Appl. No. 14/411,886, dated Nov. 1, 2018, 14 pgs.

Garmark, Notice of Allowance, U.S. Appl. No. 14/411,886, dated Apr. 10, 2019, 9 pgs.

Spotify AB, Decision to Grant, EP15192958.5, dated Aug. 18, 2017, 2 pgs.

Spotify AB, Communication Pursuant to Article 94(3), EP13766665.7, dated Feb. 28, 2019, 9 pgs.

Spotify AB, Communication Pursuant to Article 94(3), EP13766665.7, dated May 29, 2019, 6 pgs.

Spotify AB, Decision to Grant, EP17204527.0, dated Aug. 9, 2018, 2 pgs.

Spotify AB, Extended European Search Report, EP18181638.0, dated Jul. 27, 2018, 11 pgs.

(56) References Cited

OTHER PUBLICATIONS

Anonymous, Microsoft PowerPoint—Wikipedia, Jul. 17, 2019 (Jul. 17, 2019), XP055606529, retrieved from the Internet: URL:https://en.wikipedia.org/wiki/Microsoft_PowerPoint#Versions, 25 pgs.
"Power Point 2003", Sep. 29, 2005 (Sep. 29, 2005), XP055606525, retrieved from the Internet: URL:http://www.salford.ac.uk/library/help/workbooks/powerpoint03.pdf, 222 pgs.
Spotify AB, Communication Pursuant to Article 94(3), EP18181638.0, dated Jul. 24, 2019, 6 pgs.
Spotify AB, Extended European Search Report, EP15192958.5, dated Feb. 18, 2016, 11 pgs.

* cited by examiner

SYSTEMS AND METHODS FOR MULTI-CONTEXT MEDIA CONTROL AND PLAYBACK

RELATED APPLICATIONS

This application claims priority to U.S. Provisional Application Nos. 61/666,732, filed Jun. 29, 2012; 61/727,649, filed Nov. 16, 2012; and 61/767,650, filed Feb. 21, 2013; all of which are hereby incorporated by reference in their entireties.

TECHNICAL FIELD

The disclosed implementations relate generally to controlling and playing back media content.

BACKGROUND

Modern users have a variety of options for devices and ways to consume media content. For example, multiple different types of media, including text, still images, video, audio, and other digital media, can be consumed on personal computers, laptops, mp3 players, mobile phones, tablet computers, televisions, stereos, and many other electronic devices. These electronic devices typically have the ability to store digital media files in memory that is integrated into the devices. But acquiring and storing all the media content to which a user desires access can be prohibitively difficult and expensive.

Current technology also allows users to stream digital media content to their electronic devices over local networks or the Internet, for example, including over wireless connections. Streaming services allow users to have access to a much larger collection of media than would otherwise be possible. Streaming services store media content on servers remote from the electronic devices, and then send the media content to the electronic devices when it is requested. The media content is then cached on the electronic device for presentation. In some cases, the content may be temporarily buffered/stored before presentation, but typically the data is deleted from memory after presentation, allowing an almost unlimited amount of media to be streamed to a device without running out of storage space on the electronic device. Some streaming services also allow streamed content to be stored on the local device.

As more and more devices are capable of streaming media content from remote servers, as well as storing media content locally, it is often cumbersome to manage all of the different sources of media to which a user has access. Moreover, even where a user has multiple devices that can access the same content (for example, a handheld device and a laptop computer that can both access a media streaming service), each device must typically be controlled with its own dedicated interface. Accordingly, it would be advantageous to provide systems and methods that allow a user to remotely control various electronic devices in a simple and intuitive manner.

SUMMARY

A method of controlling media presentation at one device via a webpage displayed at another device is disclosed. For example, a web-log ("blog") about music may include media controls so that the reader can easily initiate playback of a song or album that is discussed in the blog. Instead of merely playing back the music at the computer that is displaying the webpage, though, the media controls in the webpage are able to initiate playback (and control other aspects of media playback) at other media presentation devices, such as a home stereo or a Wi-Fi-enabled speaker system. Moreover, the webpage need not be dedicated solely to controlling media presentation. Rather, it can be any webpage that would benefit from allowing a user to control other media devices directly from the webpage, such as the blog described above, or a social-networking site where users can create customized posts (including, for example, posts about music, musicians, artists, movies, authors, and other media content or content creators).

In order to facilitate control of media presentation as described herein, the webpage may include media presentation controls. Media presentation controls include, for example, "play," "pause," and "skip" buttons, as well as lists of media content items that can be selected for presentation (e.g., songs, videos, etc.), search controls (e.g., text input fields to search for media content), lists of devices that can be controlled, and the like.

When a user selects one of the control elements in the webpage, a command is sent to a media server that is different from the web server that provided the webpage. Specifically, the media server may be associated with a media content provider (e.g., a streaming music service) that is different from the webpage provider (e.g., a blog host or a social networking service). The command is configured to cause the media server to effectuate the media control request specified by the user. For example, if the user selected a "play" command for the song "Hey Jude," the media server will cause that song to be played at an appropriate media presentation device, such as the user's home stereo system, or the user's mobile phone.

The media presentation device at which a media command is executed may be selected in various ways. In some implementations, if a user is already listening to music from a streaming-media service on a certain device, the media command may be implemented at that device. For example, a selection of a song at a computer while listening to music on a mobile phone will cause the new song to be played back at the mobile phone. The user may also be able to select, via the webpage, a particular device on which to implement the command. For example, the webpage may include a list of devices that are available to be controlled by the user.

Exemplary Implementations

In accordance with some implementations, a method of controlling media presentation is disclosed. In some implementations, the method is performed at a first electronic device associated with a user and having one or more processors and memory storing one or more programs for execution by the one or more processors. The method includes displaying a webpage including a control element, the webpage originating from a webpage server; receiving a user input selecting the control element; and in response to the user input, sending a media control request to a media server, the media control request configured to cause the media server to control presentation of first media content at a second electronic device associated with the user, wherein the second electronic device is different from the first electronic device, and wherein the media server is different from the webpage server. In some implementations, the media server is associated with a media content provider, and the webpage server is associated with a social network provider.

In some implementations, controlling presentation of first media content includes initiating presentation of the first media content. In some implementations, initiating presentation of the first media content includes causing the first media content to be streamed to the second electronic device. In some implementations, the first media content is streamed to the second device from the media server. In some implementations, the first media content is streamed to the second device from a client device remote from the first electronic device. In some implementations, the first media content is selected from the group consisting of: an audio track; a video; an audio playlist; and a video playlist.

In some implementations, the control element is displayed on the webpage in association with an identifier of the first media content. In some implementations, the webpage is displayed in a web browser application. In some implementations, the webpage is received from the webpage server via the Internet.

In some implementations, the first electronic device is a computer (e.g., laptop, desktop, tablet, etc.). In some implementations, the first electronic device is selected from the group consisting of: a mobile phone (e.g., a "smartphone"); a handheld media player (e.g., an mp3 player, IPOD, etc.); and a portable digital assistant (PDA). In some implementations, the second electronic device is selected from the group consisting of: a computer; a mobile phone; a remote control device; a portable media player; a television; a home media receiver; a home audio/visual system; a phone/media player docking station; and a speaker. In some implementations, the second electronic device is one of a plurality of electronic devices associated with the user, and wherein the second electronic device is a default device at which media content is to be presented.

In some implementations, controlling presentation of the first media content includes adding the first media content to a media content queue being presented at the second electronic device.

In some implementations, the method further includes receiving the user input while the media server is streaming second media content to a third electronic device associated with the user.

In some implementations, the second electronic device is presenting third media content when the user input is received, the initiating presentation of the first media content including ceasing presentation of the third media content at the second electronic device.

In some implementations, displaying the webpage further includes displaying a device selection element on the webpage, wherein the device selection element includes a list of identifiers of one or more available electronic devices that are associated with the user; and the method further includes receiving a user input selecting one of the electronic device identifiers from the list, wherein the media control request identifies the selected electronic device. In some implementations, the selected electronic device is the second electronic device.

In accordance with some implementations, a method of controlling media presentation is disclosed. In some implementations, the method is performed at a first electronic device associated with a user and having one or more processors and memory storing one or more programs for execution by the one or more processors. The method includes displaying a webpage including a list of available electronic devices associated with a user, the list of available electronic devices being displayed in association with an identifier of first media content, wherein the webpage originates from a webpage server remote from the first electronic device; receiving a user input selecting one of the available electronic devices; and in response to the input, sending a media control request to a media server, the media control request configured to cause the media server to control presentation of the first media content at the selected electronic device, wherein the selected electronic device is different from the first electronic device.

In accordance with some implementations, a method of controlling media presentation is disclosed. In some implementations, the method is performed at a media server having one or more processors and memory storing one or more programs for execution by the one or more processors. The method includes receiving a media control request from a first electronic device remote from the media server, wherein the media control request was sent to the media server in response to a user selection of a control element in a webpage displayed at the first electronic device, and wherein the webpage originated from a webpage server different from the media server; and in response to receiving the media control request, controlling presentation of first media content at a second electronic device different from the first electronic device. In some implementations, the webpage is associated with a social network account of the user. In some implementations, the first media content is selected from any of: an audio track, a video, an audio playlist, and a video playlist.

In some implementations, controlling presentation of first media content includes performing at least one of sending a second media control request or streaming the first media content to the second electronic device.

In some implementations, controlling presentation of first media content includes adding the first media content to a media content queue being presented at the second electronic device. In some implementations, adding the first media content to the media content queue includes adding the first media content to the end of the media content queue. In some implementations, adding the first media content to the media content queue includes adding the first media content as a next media content item in the media content queue.

In some implementations, the method further includes, prior to receiving the media control request from the first electronic device, streaming second media content to a third electronic device separate from the first and the second electronic devices; and in response to receiving the media control request: ceasing streaming the second media content to the third electronic device; and streaming the first media content to the second electronic device.

In some implementations, the method further includes, prior to receiving the media control request from the first electronic device, streaming second media content to the second electronic device; and in response to receiving the media control request: ceasing streaming the second media content to the second electronic device; and streaming the first media content to the second electronic device.

In some implementations, the method further includes, in response to receiving the media control request, selecting a default electronic device from a list of available electronic devices associated with the user, wherein the second electronic device is the default electronic device.

In some implementations, the method further includes, prior to receiving the media control request from the first electronic device, providing a list of available devices associated with the user to at least one of the webpage server or the first electronic device.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device is provided that comprises means for performing any of the methods described herein.

In accordance with some implementations, an electronic device is provided that comprises a processing unit configured to perform any of the methods described herein.

In accordance with some implementations, an electronic device is provided that comprises one or more processors and memory storing one or more programs for execution by the one or more processors, the one or more programs including instructions for performing any of the methods described herein. In some implementations, the electronic device is a server computer system. In some implementations, the electronic device is a client computer system.

In accordance with some implementations, a system is provided that includes any combination of client and server computers that are configured to perform any of the methods described herein.

In accordance with some implementations, an information processing apparatus for use in an electronic device is provided, the information processing apparatus comprising means for performing any of the methods described herein.

In accordance with some implementations, a graphical user interface on a portable electronic device or a computer system with a display, a memory, and one or more processors to execute one or more programs stored in the memory is provided, the graphical user interface comprising user interfaces displayed in accordance with any of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
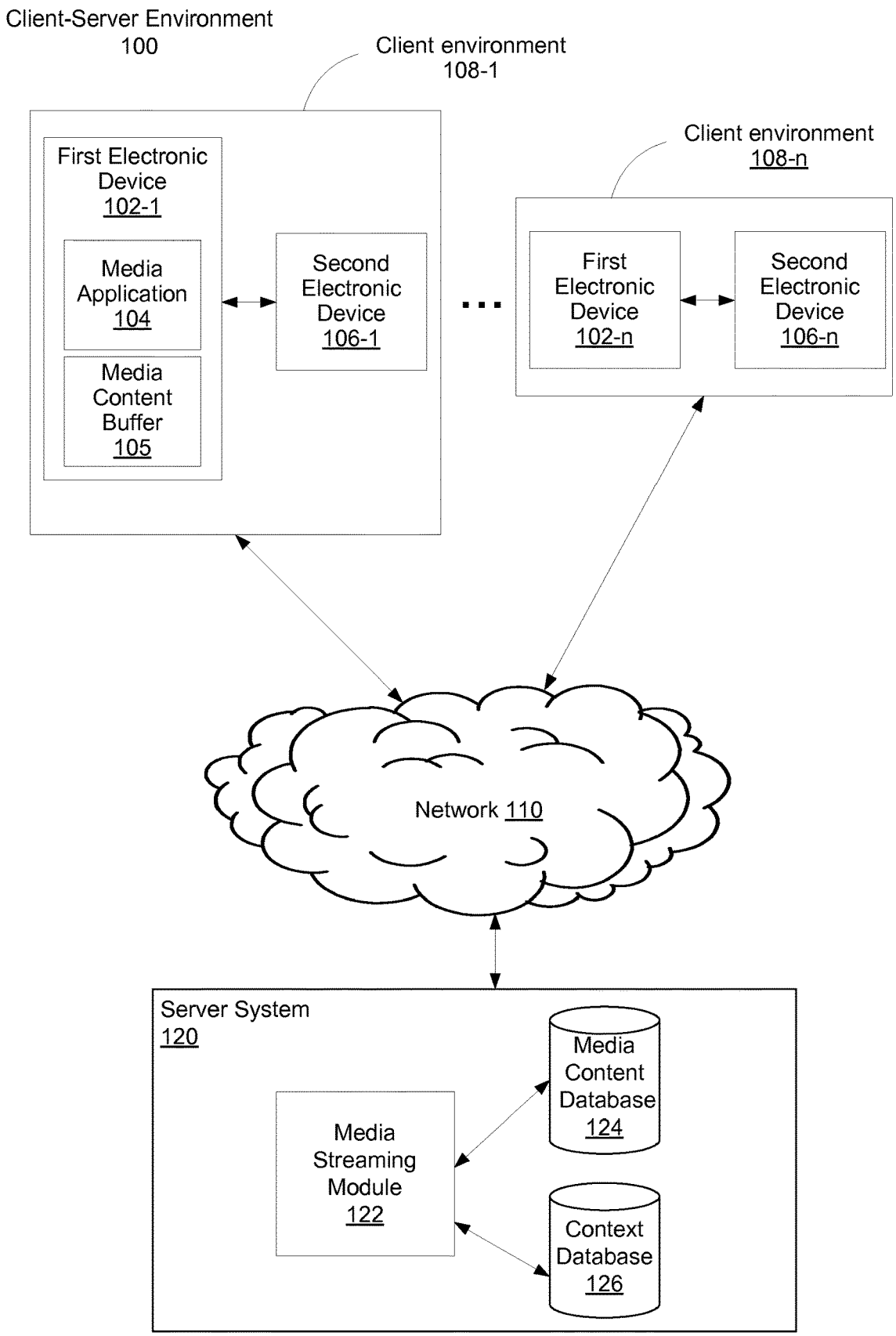
FIG. 1 is a block diagram illustrating a server client environment in accordance with some implementations.

The various implementations described herein enable a first electronic device to remotely control media presentation at a second electronic device. In some implementations, the disclosed systems and methods enable a user with a first electronic device to use the first electronic device to playback media content, and also to use the first electronic device to cause media content to be presented by a second electronic device. For example, a user may use a mobile phone (e.g., a "smartphone") to listen to music. The user may also use the same mobile phone as a remote control to control the playback (and/or other functionalities) of a second device, such as a laptop computer, a desktop computer, a home media receiver/player, or a home audio/visual system. Thus, the first device, which is separate and distinct from the second device, can both present media and control other media devices.

To enable a first electronic device to act as a remote control, the device may provide media controls with which a user can interact in order to control media presentation at the second electronic device (and/or the first electronic device itself). In some implementations, media controls are presented in webpages and/or web-based applications. For example, media controls may be provided by a webpage so that the user can remotely control a second device from the webpage without having to use a separate application. Thus, for example, when a user who is listening to music on her smartphone comes across a song suggestion in a webpage while browsing the web on her laptop, she can simply press the "play" button in the webpage and the song will be played back on her smartphone instead of her laptop. Various aspects of controlling a second electronic device via web-based media controls are discussed below with reference to FIGS. 2B and 5-7.

In order to cause media control operations to be performed at a second electronic device, the first electronic device sends media control requests to the second electronic device (and/or a remote server system). Media control requests are communications configured to cause some media control operation, such as initiating or controlling media content playback (e.g., play, stop, pause, change volume, skip, etc.). Increasingly, homes, businesses, and other locations provide local communications networks, such as a wireless or wired Ethernet network, a BLUETOOTH network, or the like, to which multiple devices are connected. Accordingly, a person's mobile phone, home media system, computer, television, etc., may all be connected to the same local communications network, allowing these devices to communicate with each other and with other devices outside the local communications network (e.g., on the Internet) to send and receive the media control requests. In some implementations, such devices communicate with nearby devices via a peer-to-peer connection (e.g., a BLUETOOTH peer-to-peer link, or any other appropriate communication technique, protocol, or standard).

In some implementations, the first device sends media control requests to the second device through multiple channels, such as through a central server as well as via a local network or a peer-to-peer connection. This increases the speed and reliability of the media control requests, thus creating a more responsive and robust remote-control system for the user. Additionally, sending the media control requests via the different paths (e.g., through a local network or peer-to-peer connection as well as through the Internet) ensures that the remote control functionality operates properly under many different network connectivity situations. For example, if a user's peer-to-peer connection or local wireless network (e.g., a wireless LAN, PAN, etc.) is not configured to allow a first device (e.g., a smartphone) to communicate to a second device (e.g., a home stereo system) via the peer-to-peer or local network, media control requests are still sent from the first device, through the Internet (e.g., through a cellular data network), to the second device. If, on the other hand, the first device does not have access to the Internet, but the user's peer-to-peer connection or local wireless network is configured to allow the first and second devices to communicate to one another, the media control requests are still sent to the second device despite the lack of Internet connectivity.

Accordingly, in some implementations where media control requests are sent via the Internet, the media control requests are sent from the first electronic device to a server system located remotely from the first electronic device (and/or the second electronic device). The server system then causes the second electronic device to present media in accordance with the request from the first electronic device.

As noted above, in some implementations, the first and second electronic devices are located on the same local network. In some implementations, the local network is a Local Area Network (LAN). In some implementations, a LAN is a type of local network that creates IP address space behind a traffic routing device (e.g., a wired or wireless router) and limits incoming connections based on the specific requirements for the Local Area Network. In some implementations, LANs facilitate connections between devices on the LAN without using a public domain name system. In some implementations, devices on a LAN communicate using TCP/IP protocols. In some cases, Local Area Networks are confined to a single building or a group of buildings in relatively small geographical proximity. In some implementations, the local network is a Personal Area Network (PAN). In some implementations, a PAN is a network of devices that spans a relatively small geographical distance, such as a few inches or yards. In some implementations, a PAN is established using a peer-to-peer and/or an ad-hoc network. In some implementations, devices in a peer-to-peer and/or ad-hoc network communicate using BLUETOOTH communications technology, wireless universal serial bus, infrared communication protocols, etc. In some implementations, a local network is a peer-to-peer connection that includes only two devices, without any intermediate devices, such as a point-to-point BLUETOOTH connection.

Local networks may be wired or wireless. Information (e.g., media control requests) may be sent between devices in a local network using anycast, unicast, broadcast, and/or multicast addressing/routing methodologies, and may be sent according to any appropriate protocol, including but not limited to Transmission Control Protocol (TCP), User Datagram Protocol (UDP), Universal Plug and Play protocols (UPnP), Sockets Direct Protocol (SDP), Hypertext Transfer Protocol (HTTP), Hypertext Transfer Protocol Secure (HTTPS), etc.

In some implementations, the server system is located remotely from both the first and the second electronic device. For example, in some implementations, the server system is not located on the same local network (e.g., it is not in the same LAN, PAN, peer-to-peer network, ad-hoc network, etc.) as either the first electronic device or the second electronic device. Thus, the first and second electronic devices can communicate over a local network, as described above, while, in contrast, communication between the server system and the first and second electronic device is over a network such as the Internet.

Another feature is that the same application, and even the same graphical user interface (GUI), can be used for both presenting media content by the first electronic device and for controlling the presentation of media by the second electronic device. This provides a seamless experience for the user, as the user does not need to use different control interfaces (e.g., buttons, touchscreens, remote controls, etc.) for each device, thus obviating the need for the user to learn and use different control interfaces, keyboard layouts, media control functionalities, and the like, for different devices.

Furthermore, in some implementations, a media control request is configured to change the active presentation device for media content that is currently being presented. For example, a user who is listening to a music playlist on a mobile phone can request to change the active listening device to a home stereo system. In some implementations, the request to change media presentation devices is initiated by a user (e.g., via a user interface on the mobile phone). In some implementations, the request is initiated automatically and without user intervention by automatically detecting a predetermined condition, such as location, date, time of day, and/or day of week. For example, if a user is listening to an audio playlist on a mobile phone while walking home, the user's home stereo system may begin playing back the audio instead of (or in addition to) the mobile phone once it is determined that she has arrived at her home (e.g., using a positioning system (e.g., a GPS, cell-tower triangulation, etc.), proximity sensors, inertial monitoring devices, etc.).

In some implementations, the switching occurs in response to the server system receiving notification from the first electronic device that a specific predetermined condition has been met. For example, the first electronic device may monitor its geographic location, and when it determines that it has moved into (or out of) a predefined area, the first electronic device will send a notification to the server system that the predetermined condition has been met. In another example, the condition is met when the server detects a change in the state of the first electronic device, such as when the first electronic device establishes communication with a particular wireless network, or when the first electronic device pairs with or detects the second electronic device. In response, the server system ceases transmitting the media content stream to the first electronic device and begins transmitting the media content stream to a second electronic device. In this way, the user is able to establish conditions for automatically changing the device to which media content is being streamed or stream between devices.

Automatic switching may also be conditioned on additional factors, such as whether a device on which presentation is to be initiated is already presenting other media content, a time of day, a time of week, etc. For example, continuing the previous example, if the home stereo system is already presenting media content when the user returns home, the home stereo system will not switch to the playlist that was being presented on the user's mobile phone. This, in this case, the home stereo is available to be automatically activated only when it is idle and/or not presenting other media content.

In some implementations, the active presentation device is configured to automatically change only during predetermined time or date ranges. For example, in some implementations, a home stereo system will automatically begin presenting media content only during daytime hours (e.g., between 10:00 AM and 8:00 PM), and/or during weekends.

In some implementations, different users have different priority levels for automatic device switching. This can help avoid frequent and annoying changes in media presentation due to different users returning home, entering a particular area, etc. In some implementations, when a user initiates presentation of media content at a device, the user's priority level is logged or stored. When another user attempts to initiate presentation of different media content at that device, the other user may do so only if his or her priority level is above the first user. In some implementations, priority levels are only used to determine whether automatic device switching may occur. Thus, if a lower-priority user returns home while listening to a certain playlist, but a higher-priority user is already listening to music (or presenting other media content) via the home stereo, the lower-priority user's playlist will not be automatically presented via the home stereo system. On the other hand, manual requests to change the media content being presented by the home stereo system may be implemented regardless of the priority level of the requestor.

In some implementations, media presentation devices can present media content regardless of the origin of the content. For example, content in the audio playlist in the preceding example may be stored on the mobile phone, and streamed to the home stereo system from the mobile phone (e.g., via a local connection, such as a wireless LAN, peer-to-peer connection, a public network such as the Internet, etc.). If the content in the audio playlist is being streamed from a separate source (e.g., a remote server associated with a media content provider, a local media server, etc.), then the source can switch the destination of the audio stream from the mobile phone to the home stereo system.

In some implementations, when the active presentation device is changed, media content is delivered to the active presentation device regardless of the origin of the content. For example, when a song in an active playlist is stored on the user's mobile phone (but presented by the user's home stereo system), the song will be streamed or otherwise provided by the mobile phone; when a song is stored on a user's network accessible storage (NAS) system, the song will be streamed or otherwise provided by the NAS; when a song in the playlist is stored in a remote server, that song will be streamed or otherwise provided by the remote server. Songs that are stored in different locations (e.g., on the mobile phone and the remote server) can be included in the same playlist, and can be streamed to whatever device is playing the playlist.

In some implementations, when the active presentation device is changed, the context of the content stream, originally available on the first presentation device, becomes available on the second presentation device. The context of a content stream includes various information about the content stream, including the position within the currently playing media content, the previously presented media content (e.g., a play history), the position within previously presented media content (if unfinished), the media content to be played next, metadata of the current or upcoming media content (e.g., artist, album, track), etc. For example, the media content, once playback is initiated at the second electronic device, will retain the position in the current media content item and the position of the active playlist. In this way the media stream being presented on the first device is seamlessly transferred to a new device while maintaining the same state as on the first device. Thus, users may easily switch between devices without fear of losing their place in a song, a movie, a playlist, etc.

In some implementations, when media content is being presented at one device, one or more other devices buffer/cache/store a portion of that media content, for example, in case the user should choose to present the media content with one of the other devices instead of or in addition to the current device. (In some implementations, the device at which media is being presented also buffers/caches/stores media content before it is presented to the user.) In this way, the other devices are able to begin presenting the media content quickly, as the media presentation can begin at the other device(s) as soon as they receive a request to do so, rather than waiting for communications to be established between a media content source and the presentation device, for initial buffering of streaming content prior to presentation, and the like.

In some embodiments, a device that is presenting media content buffers/caches/stores upcoming content (e.g., a next media item in a playlist). In some implementations, the cached/buffered/stored content is provided to other devices in the local network, even when the other device(s) are not actively presenting the media content. In some implementations, the cached/buffered/stored content is sent between the devices in a local network (e.g., within a LAN, using a peer-to-peer connection, or the like). In some implementations, the cached/buffered/stored content is sent from a first device to a second device when media presentation is to begin at the second device. For example, when media content is being presented by a smartphone, and a user requests that the media be presented instead by a home stereo system, the media content that has been cached/buffered/stored at the smartphone is sent (e.g., via the LAN, BLUETOOTH, etc.) to the home stereo system. Accordingly, the second device can begin presenting content from the cache/buffer/store as soon as it is received from the first device, instead of waiting for a connection to the media content source to be established, a new cache/buffer/store to be populated, etc. Presentation can thus be initiated at the second device quickly and without undue delay.

In some implementations, the cached/buffered/stored content (or a portion thereof) is periodically or continuously mirrored from a first device to a second device. In this way, at least some of the upcoming media content is cached/buffered/stored at both devices whenever media content is being presented at one of them. In some implementations, only a subset of the content that is cached/buffered/stored at the first device (e.g., the active media presentation device) is mirrored at the second device. For example, in some implementations, the first device caches/buffers/stores approximately 10 seconds of upcoming media content, and the second device caches/buffers/stores approximately 3 seconds of upcoming media content. In some implementations, the amount of media content that is cached/buffered/stored is measured in a quantity of data rather than a playback duration; for example, the devices may cache/buffer/store 0.1 MB, 0.2 MB, or 0.5 MB of upcoming media content. In some implementations, more or less media content is cached/buffered/stored at the first and second electronic devices. In some implementations, the second device caches/buffers/stores enough media content to allow for the second device to establish communication with a remote source (e.g., a media content server or remote client device from which the media content is accessible). Using one or more of the foregoing techniques, the second device can begin presentation of requested media content before a connection with the media source is established. Seamless presentation of the content is therefore provided while also ensuring negligible delay in initiating the presentation at the second device. In some implementations, media content is cached/buffered/stored at a third device, such as a computer, NAS, hard drive, etc., and any other device (e.g., the second device) can download, mirror, or otherwise obtain the cached/buffered/stored content from the third device. In some implementations, content that is cached/buffered/stored at the third device is automatically deleted after it is presented. For example, the content may be deleted immediately after it is presented, or it may be deleted when the cache reaches a predetermined limit (e.g., using a first in, first out (FIFO) prioritization). In some implementations, the content is not automatically deleted after it is presented. For example, it may remain until a user manually deletes the content.

Attention is now directed to the figures, and in particular to FIG. 1, which is a block diagram of a client-server environment, according to some implementations. The client-server environment 100 includes one or more client environments (108-1 . . . 108-n) and a server system 120 that are connected through a network 110. In some implementations, the client environment 108-1 includes one or more electronic devices (e.g., first electronic device 102-1 and second electronic device 106-1). In some implementations, the server system 120 is associated with a media content provider to which users (and their electronic devices) may have accounts that enable the user to access media content from the server system 120 (or other servers associated with the content provider). The network 110 includes any of a variety of networks, including wide area networks (WAN), wireless networks, wired networks, the Internet, or a combination of such networks.

In some implementations, the client environment 108-1 includes a first electronic device 102-1. In some implementations, the first electronic device 102-1 is one of the group of: a personal computer, a mobile electronic device, a laptop, a tablet computer, a mobile phone, a digital media player, or any other electronic device able to present media content.

In some implementations, the client environment 108-1 also includes a second electronic device 106-1. In some implementations, the second electronic device 106-1 is one of the group of: a computer, a home audio/visual system, a home media receiver/player, or any other electronic device able to present media content. In some implementations, both the first electronic device 102-1 and the second electronic device 106-1 are associated with a common user account (or associated user accounts) provided by a content provider with which the server system 120 is associated. For example, in some implementations, the server system 120 is operated and/or provided by a subscription-based media streaming service to which a user may have an account, and the first and second electronic devices 102-1, 106-1 are each associated with account credentials that enable them to communicate with and receive content from the server system 120.

In some implementations, both the first electronic device 102-1 and the second electronic device 106-1 are on the same local network. In some implementations, the first electronic device 102-1 and the second electronic device 106-1 are on different local area networks. In some implementations, the local network is a Local Area Network. In some implementations, the server system 120 is not located on the same Local Area Network as either the first electronic device 102-1 or the second electronic device 106-1.

As noted above, Local Area Networks are often associated with a relatively small geographic area (e.g., one house or building) and create IP address space behind a traffic routing device. In some implementations, the traffic routing device uses network address translation to connect devices within the LAN to devices outside the LAN. Network address translation is the process of readdressing packets by modifying the IP address contained in each packet so that the packets reach their intended destination device. Network address translation allows a plurality of electronic devices on the Local Area Network to connect to the Internet through a single IP address (e.g., the IP address of the traffic routing device). The traffic routing device (i.e. a router) receives incoming packets, determines which device on the Local Area Network is the intended recipient, and modifies the IP address to correctly identify that device. For example, a Local Area Network has 5 devices with local IP addresses 192.168.0.1-192.168.0.5 that all connect to a router. The router connects to the Internet and has an IP address of 12.162.29.2. Using network address translation, the router translates the source address for all communications sent from any of the 5 devices and intended for destinations in the Internet to be 12.162.29.2 (the router's IP address). On the other hand, the router collects all packets incoming from the Internet, determines the intended recipient device based upon the contents of each packet, and translates the destination IP address to the address of the correct device on the Local Area Network. So when the intended device is the device with Local Area Network IP address 196.168.0.2, the router would change the destination address to this address. Local Area Networks also commonly use firewalls to limit incoming connections. In this way, computer devices outside of the Local Area Network are generally not able to communicate directly with the devices on a Local Area Network. Indeed, in some Local Area Networks the devices in the network are not contactable even by other devices in the Local Area Network.

In some implementations, both the first electronic device 102-1 and the second electronic device 106-1 are on the same Personal Area Network. In some implementations, the Personal Area Network uses BLUETOOTH communication technology. In some implementations, the server system 120 is not located on the same Personal Area Network as either the first electronic device 102-1 or the second electronic device 106-1.

In some implementations, the first electronic device 102-1 includes a media content presentation and control application 104 (hereinafter "media application"). The media application 104 is able to control the presentation of media by the first electronic device 102-1. For example, the media application 104 enables a user to navigate media content items, select media content items for playback on the first electronic device 102-1, create and edit playlists, etc. In some implementations, media content is stored by the first electronic device 102-1 itself. In other implementations, the media content is stored by a server system 120, which may be located remotely from the first electronic device 102-1. The media content is then streamed from the server system 120 to the first electronic device 102-1 over the network 110.

In some implementations, the data streamed from the server system 120 is temporarily stored/cached by the first electronic device 102-1 in the media content buffer 105 in the memory of the first electronic device 102-1. In some implementations, media content stored in the media content buffer 105 is removed after the media content is presented by the first electronic device 102-1, allowing new media content data to be stored in the buffer 105. In other implementations, at least some of the media content stored in the media content buffer 105 is retained for a predetermined amount of time after the content is presented by the first electronic device 102-1 and/or until other predetermined conditions are satisfied.

In some implementations, the media application 104 is also able to control media content presentation by the second electronic device 106-1, which is distinct from the first electronic device 102-1. Thus, the user is able to use the media application 104 to cause the electronic device 102-1 to act both as a media presentation device as well as a remote control for other media presentation devices. This allows a user to control media presentation on multiple electronic devices from within a single application 104, and/or using a single user interface.

In some implementations, when a user wants to use the first electronic device 102-1 to control media presentation by the second electronic device 106-1, the user interacts with the media application 104 to send a media control request (e.g., server media control request 112, FIG. 2B) to the server system 120. The server system 120 receives the media control request over the network 110. For example, the user may press a button on a touchscreen of the first electronic device 102-1 in order to send the media control request to the server system 120 and/or directly to the second electronic device 106-1. As described below, a media control request is, for example, a request to begin presentation of media content by the second electronic device 106-1. Though often used herein to describe requests to initiate or begin presentation of media by the second electronic device 106-1, in some implementations, media control requests also include requests and/or signals to control other aspects of the media that is being presented on the second electronic device 106-1, including but not limited to commands to pause, skip, fast-forward, rewind, adjust volume, change the order of items in a playlist, add or remove items from a playlist, adjust audio equalizer settings, change or set user settings or preferences, provide information about the currently presented content, and the like.

The client-server environment 100 also includes a server system 120. In some implementations, the server system 120 includes a media streaming module 122, a media content database 124, and a context database 126. The media content database 124 stores media content that can be presented by an electronic device. For example, in some implementations, the media content database 124 stores audio (e.g., music, audiobooks, etc.), video (e.g., movies, television shows, etc.), images, or other content that can be streamed to other electronic devices. In some implementations, the media content database 124 includes data stored in different formats and file types to allow a variety of different devices and/or applications to receive streamed content. In some implementations, the data is stored in a single file format and is converted/transcribed to the appropriate data type before or as it is streamed to a remote device.

In some implementations, the server system 120 includes a media streaming module 122. In some implementations, the media streaming module 122 receives media control requests from electronic devices and streams media content in response. In some implementations, the media streaming module 122 receives media control requests from a first electronic device 102-1 and forwards the request to a second electronic device 106-1, which then makes the final request to the server system 120 for the media content. For example, a user sends a media control request to the server using a mobile phone (a first electronic device) requesting that media be presented by a home stereo system (a second electronic device). The server system 120 then sends the requested media (and/or the media control request) to the home stereo system. This and other techniques are discussed in greater detail below with respect to FIGS. 5-7.

In some implementations, the received media control request includes information identifying the electronic device to which the server system 120 should forward the media control request. For example, a user may have multiple electronic devices that can present media from the server system 120, such as a mobile phone, a computer system, a television, a home stereo, etc. In some implementations, the identifying information is a unique or semi-unique device identifier, such as an IP address, a Media Access Control address (MAC address), a user-specified device name, an International Mobile Equipment Identity number (IMEI number), or the like. Accordingly, the media control request will identify that a request is intended for the home stereo, for example, so that the server system 120 can send the requested media and/or the media control request to the home stereo.

In some implementations, the server system 120 includes a context database 126. The context database 126 stores data associated with the presentation of media content by an electronic device. In some implementations, the context database 126 includes, among other things, the current position in a media content stream that is being actively presented by an electronic device, a playlist associated with the media content stream, previously played content, skipped pieces of media content, and previously indicated user preferences. For example, the context database 126 may include information that a content stream to an electronic device currently is presenting a song, at 1 minute and 23 seconds into the song, as well as all the songs played in the last hour and the next 20 songs in the playlist. In some implementations, the server system 120 transmits the context associated with a media content stream to the device that is presenting the content stream so that one or more items of context information can be used by the device, such as for display to the user. In some implementations, when the device to which the media content is being streamed changes, the server system 120 transmits the context associated with the active media content to the newly active device.

Figure 2A:
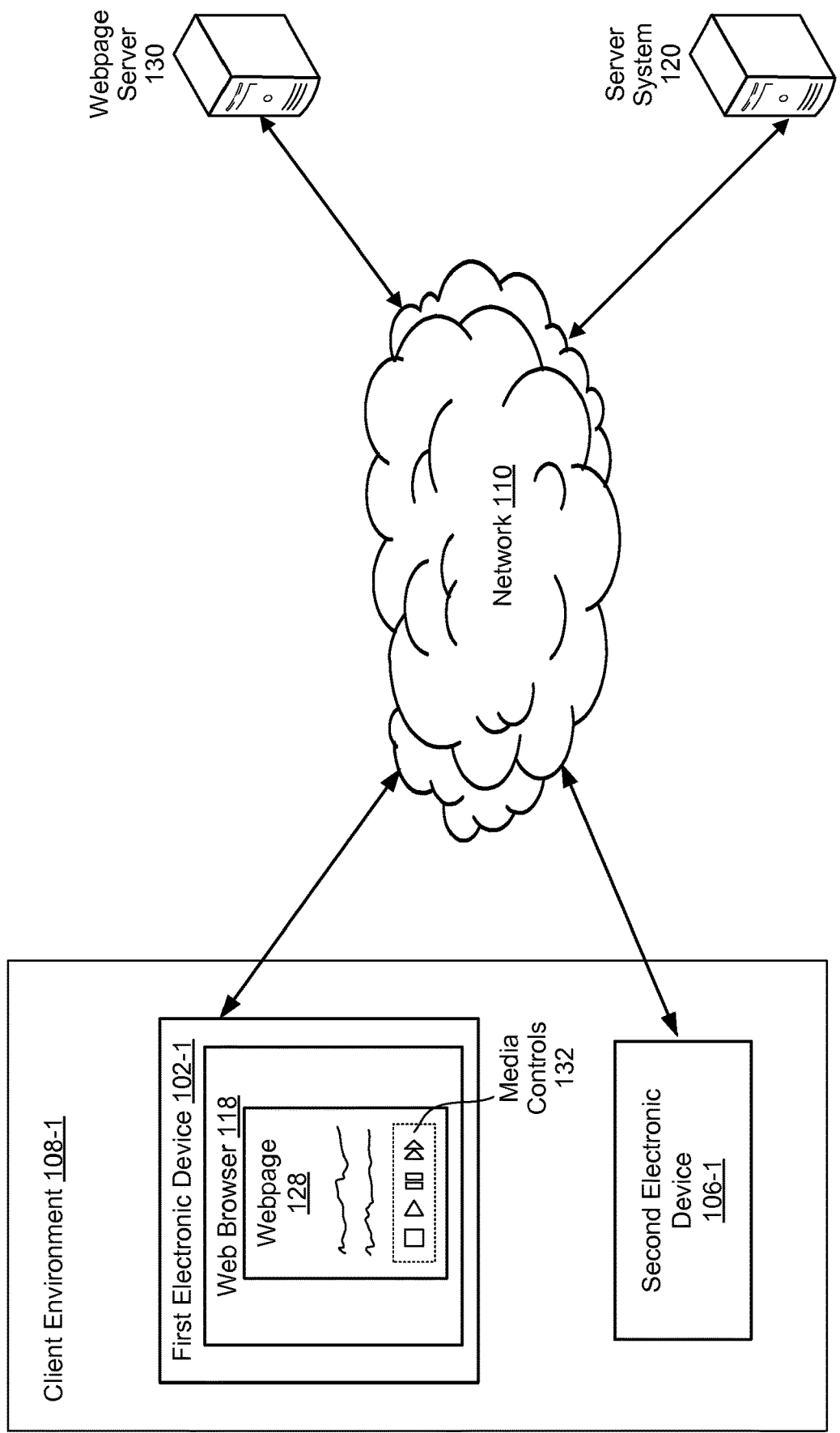
FIG. 2A is a block diagram illustrating a client-server environment in accordance with some implementations.

FIG. 2A is a block diagram illustrating an implementation of the client-server environment 100. FIG. 2A illustrates an environment in which a user may control presentation of media content using controls on a webpage displayed at a laptop or desktop computer (or other computing device, such as a tablet computer, smart phone, etc.), in order to control media presentation on a different device (e.g., a home audio/visual system). Traditionally, if a user is browsing a social networking site using a computer and comes across a posting that includes a music recommendation, the user can press a "play" button associated with the recommendation to cause the computer to begin playing the music (e.g., as described in commonly owned U.S. patent application Ser. No. 13/443,781, filed Apr. 10, 2012, entitled "Systems and Methods for Controlling a Local Application Through a Web Page," which is hereby incorporated by reference in its entirety). As described with reference to FIG. 2A, however, the "play" button can cause any other capable electronic device to begin playing the music instead of just the user's computer. For example, the music can begin playing at the user's home audio/visual system. Thus, an integrated, flexible, and comprehensive media control solution—integrating different, distinct devices—can be provided through simple webpage-based media controls.

As shown in FIG. 2A, the client-server environment includes a client environment 108-1, a server system 120, and a webpage server 130, all of which are connected through the network 110. The network 110 includes any of a variety of networks, including wide area networks (WAN), wireless networks, wired networks, virtual private networks (VPNs), the Internet, or a combination of such networks.

As described above, in some implementations, the server system 120 is associated with a media content provider to which users (and their electronic devices) may have accounts that enable the user to access media content from the server system 120 (or other servers associated with the content provider). In some implementations, the webpage server 130 hosts one or more webpages (e.g., webpage 128, discussed below) that can be accessed and/or downloaded by other computers (e.g., a first electronic device 102-*n*). In some implementations, the webpage server 130 is associated with a social networking service. In such implementations, the webpage server 130 may store information and data associated with providing an online social network, including, for example, webpages, account information, user profiles, media content (including photographs, videos, music, etc.), social posting information and content, user's networks (e.g., "friend lists" and/or other identifiers of connections between users), and the like.

In some implementations, the client environment 108-1 includes a first electronic device 102-1 and a second electronic device 106-1. In some implementations, the first electronic device 102-1 includes a web browser 118 (e.g., a computer application configured to access and/or present web-based content, including webpages, on a user interface device associated with a computer). The web browser 118 may be an application that is designed primarily for browsing the web (e.g., MOZILLA FIREFOX), or an application or other software that includes web browsing or webpage display functionality, in addition to other functions. In some implementations, the web browser 118 is incorporated into the media application 104, and/or describes functionalities of the media application 104.

In some implementations, the web browser 118 displays a webpage 128 received from a webpage server 130. In some implementations, instead of (or in addition to) displaying the webpage 128 using the web browser 118, the first electronic device 102-1 stores and/or executes an application (or any computer program or software) that allows a user to interact with the webpage server 130. Thus, a user may access information from the webpage server 130 via a webpage 128 that is displayed in the web browser 118, and/or via a dedicated application. As an example of the former case, a user can access a webpage (e.g., an HTML document) of a social networking service via a web browser (e.g., MOZILLA FIREFOX). In the latter case, for example, a user can access web-based content from a social networking service via a dedicated application for that social networking service. (When received, displayed, and/or rendered in the context of a dedicated application or other computer program that is not principally a web browser, the web-based content may be considered a webpage, even if it is not an HTML document.) In either case, at least some of the information relating to the user's social network account (e.g., text, photos, social postings, friend lists, etc.) is provided by the webpage server 130. Dedicated social network applications may be frequently used, for example, in implementations where the first electronic device 102-1 is a smartphone or a mobile device where users typically access social networks through dedicated "apps." The particular method chosen for accessing information from the webpage server 130 in various implementations may be selected depending on the design needs and constraints of the devices, operating systems, or other aspects of the particular implementation. (While the present discussion refers primarily to controls in a webpage 128, the features and ideas discussed apply equally to media controls that are presented in other contexts and interface environments as well, such as the dedicated applications described above.)

In some implementations, the webpage server 130 is distinct from (e.g., associated with a different source, business entity, or service provider) than the server system 120. For example, in some implementations, the server system 120 is associated with a media content provider that provides access to media content such as music, video, and the like, and the webpage server 130 is associated with a social network provider.

The webpage 128 includes media controls 132 that allow a user to control presentation of media content. Media controls include, for example, any affordance that a user can select (e.g., by clicking, touching, pressing, swiping, etc.) in order to control the presentation of media content. For example, clickable icons representing media controls may be included in a webpage that is displayed on a laptop or desktop computer. As another example, touchable icons may be included in a webpage that is displayed on a tablet computer or mobile phone (or other computer) that includes a touch sensitive input device such as a touchscreen.

In some implementations, media controls 132 are retrieved from a remote source. For example, in some implementations, the webpage 128 includes code that, when executed by the web browser 118, causes the web browser 118 to request the media controls 132 (including, for example, HTML code that enables the media controls 132) to be downloaded from a remote source. In some implementations, the remote source is the webpage server 130, the server system 120, and/or one or more other server systems. (In some implementations, code that enables the media controls 132 is stored and/or cached locally at the first electronic device 102-1.)

For example, a user may access a webpage 128 associated with a social networking site by requesting the webpage 128 from the webpage server 130. When the webpage 128 is loaded and/or rendered by the web browser 118, the web browser 118 may be caused to download content that includes the media controls 132. In this example, the content may identify a music track and enable the user to select the music track for presentation. In some implementations, the content includes information such as album art, title/artist information, media controls 132, information related to social contacts that have liked, shared, and/or listened to the music, etc. This content may be downloaded from various sources, such as the webpage server 130 (associated with the social networking site) and/or the server system 120 (associated with a provider of media content).

In some implementations, media controls 132 are associated with media content provided by the server system 120 (e.g., a music track) such that selection of a media control 132 affects presentation of media content associated with the server system 120. For example, media controls 132 may include play, pause, stop, and skip controls (among various other possibilities). When a user selects a media control 132, then, media presentation for that media content may be affected according to the control that was selected. In some implementations, selection of a media control 132 causes a request (e.g., a media control request) to be sent to the server system 120 so that the appropriate media control can be performed. In some implementations, the request includes information that identifies the user and/or otherwise associates the request with a user account. Thus, the server system 120 can control the media content for that particular user in accordance with the user's selection. Examples of media control requests, their content, and how they operate are discussed with respect to FIGS. 1 and 2B.

As noted above, the media controls 132 may be configured to control media presentation at the first electronic device 102-1 and/or the second electronic device 106-1. Controlling media content presentation at the first electronic device using controls embedded in a webpage is described in commonly owned U.S. patent application Ser. No. 13/443,781, which is hereby incorporated by reference in its entirety.

In order to control media content presentation at the second electronic device 106-1, selection of a media control 132 causes the first electronic device 102-1 to communicate with the server system 120 (e.g., via an HTTP request) to request that the selected media control be performed. Accordingly, the second electronic device 106-1 can communicate with the server system 120 via the network 110, and is associated with the user of the first electronic device 102-1. Thus, for example, if a user selects a "play" control corresponding to the song "Jingle Bells" (e.g., from the webpage 128), a request is sent from the first electronic device 102-1 to the server system 120 (and/or any other appropriate server) that will cause the song "Jingle Bells" to be played back on the second electronic device 106-1. By sending media control signals to the server system 120, which in turn controls the playback on the second electronic device 106-1, a user can control the second electronic device 106-1 through the webpage without any direct, local, peer-to-peer communication between the first and second electronic devices 102-1, 106-1. However, in some implementations, the first and second electronic devices 102-1, 106-1 also (or instead) communicate via local and/or peer-to-peer connections.

In some implementations, a user is associated with more than one second electronic device. Thus, in some implementations, the server system 120 includes a list of devices that are associated with a given user account. For example, the first electronic device 102-1 may be a laptop computer and the second electronic devices are a smartphone, a home audio/visual system, a television, and another computer, each of which are identified in a user's account information, along with identifiers that allow the server system 120 to communicate with each of those electronic devices. In some implementations, the server system 120 stores IP addresses, MAC addresses, or other identifiers of each electronic device associated with a particular user account.

When a user selects a media control 132 from a webpage 128 in order to control media presentation at a second electronic device, various techniques may be used to select which of the user's various electronic devices is controlled. In some implementations, if media presentation is active at a device associated with a user (e.g., if audio, video, or other media content is being played back at one of the user's other devices), the selected media controls are implemented at the active device. Thus, if a user is listening to music on a home audio system, and selects a control in a webpage to begin playback of a different song, that song is played back at the home audio system. In some implementations, this technique applies to any control that is selected, including a skip, pause, stop, seek, "add to playlist," or any other control.

In some implementations, if none of the devices associated with a user are actively presenting media content when a media control 132 is selected, one or more rules are applied to determine what device will be controlled in accordance with the selection. In some implementations, the requested control is implemented at a device that is listed as the user's default device. Thus, for example, if a user is not listening to any music, and selects a "play" control corresponding to a song from a website, the song will begin playing at whatever device the user has selected as the default device. In some implementations, the control is implemented at the device that was most recently presenting media content. In some implementations, the control is implemented at the device to which the user is closest. (Proximity of a user to various electronic devices may be determined using a positioning system (e.g., a GPS, cell-tower triangulation, etc.), proximity sensors, inertial monitoring devices, etc.) In some implementations, the control is implemented at the device that is most used (e.g., based on frequency, overall playing time, etc.).

In some implementations, the media controls 132 and/or the webpage 128 include device selection controls that allow a user to choose, from a list of available electronic devices, a specific device which will be controlled in accordance with a selection of a media control. For example, when the user is browsing a blog, social networking website, or the like, the user may come across a webpage 128 that includes a media control 132. When selected, the webpage 128 may present a menu including a list of electronic devices that are associated with the user and/or that are available to be controlled. For example, a dropdown menu (or other type of user interface element(s)) may list options such as "Play at iPhone," "Play at Living Room Stereo," "Play Here," and/or "Play on Tablet PC." The user may then select a device, and the server system 120 will control the selected electronic device in accordance with the selected control. In some implementations, the menu only includes those devices that are currently available to present media (e.g., those that are currently "online" and/or logged in to the same account associated with the viewer of the webpage).

As noted above, one media control that may be included in a webpage 128 is a "play" control. A "play" control may be configured to cause several different types of responses, depending on various factors and/or conditions of the client environment 108-1. In some implementations, if a "play" control is selected while a second electronic device 106-1 is currently presenting media content, that media content is interrupted so that the newly selected media content can be presented instead. In some implementations, if the second electronic device 106-1 is currently playing media content, selection of a "play" control causes the selected media content to be added to a media queue and/or playlist as a "next" item to be played when the currently active media content is over. In some implementations, it is instead added to the end of a queue and/or playlist.

Figure 2B:
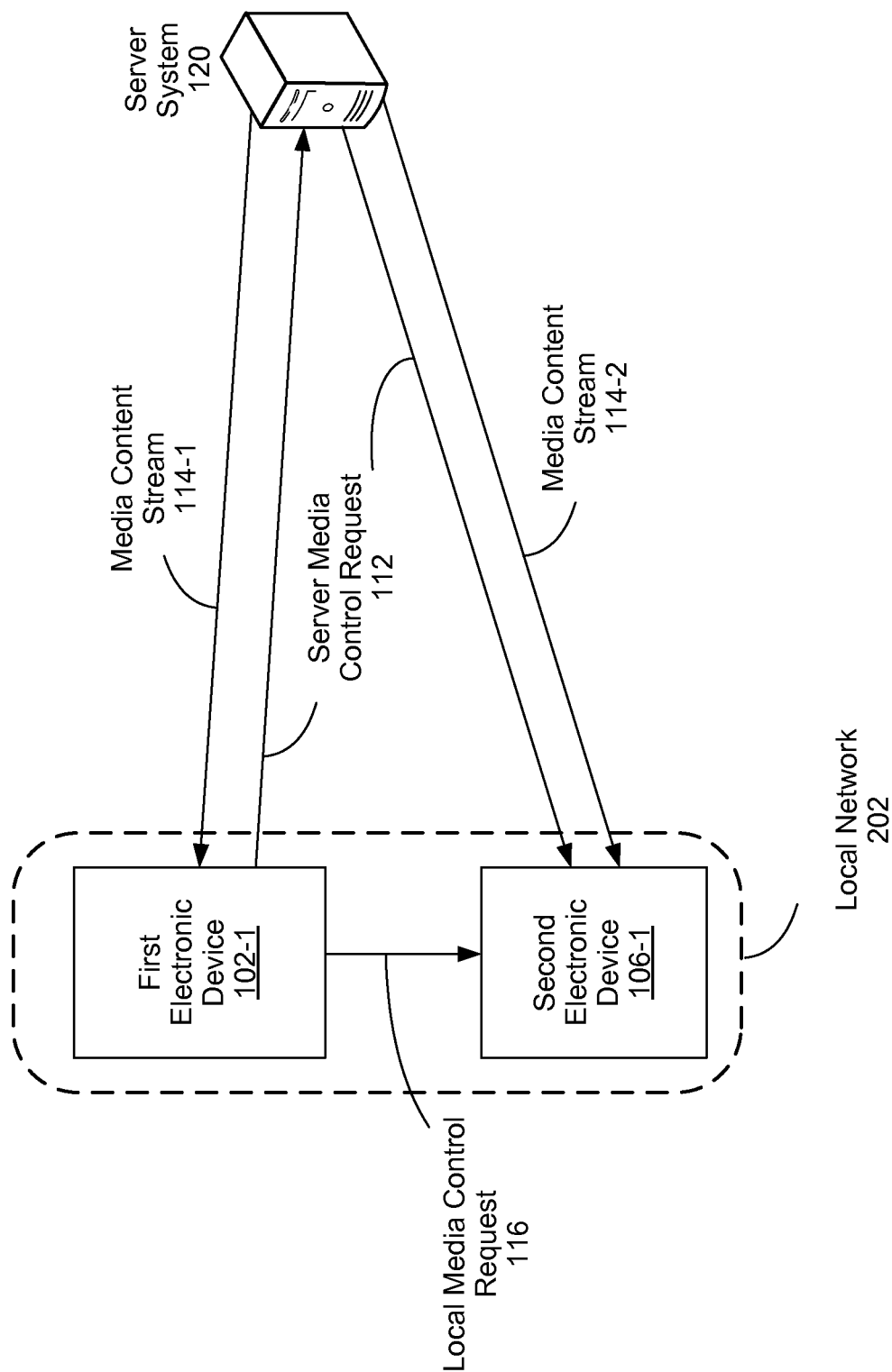
FIG. 2B is a block diagram illustrating a client-server environment in accordance with some implementations.

FIG. 2B is a block diagram illustrating an implementation of the client-server environment 100. The client-server environment 100 includes a local network 202 that encompasses at least a first electronic device 102-1 and a second electronic device 106-1. Client-server environment 100 also includes a server system 120 that is located remotely from and is not integrated into the local network. In some implementations, the server system 120 stores media content and streams the stored media content to remote electronic devices upon request. In some implementations, the local network 202 is a Local Area Network, and the server system 120 is not within the IP address space of the Local Area Network. Thus, the server system 120 communicates with either the first or the second electronic devices (102-1, 106-1) via the Internet. For example, the media content streams 114-1, 114-2, and the server media control requests 112, discussed below, may be transmitted via the Internet.

In some implementations, a user of the first electronic device 102-1 uses an application running on the first electronic device 102-1 to send a server media control request 112 to the server system. In some implementations, the server media control request 112 includes information identifying a second electronic device to which the control request is addressed, as well as a payload that indicates what media control operation is to be performed by the second electronic device. As noted above, in some implementations, media control requests include requests to control aspects of the media that is being presented on the second electronic device 106-1, including but not limited to commands to initiate media presentation, cease media presentation, pause, skip, fast-forward, rewind, adjust volume, change the order of items in a playlist, add or remove items from a playlist, adjust audio equalizer settings, change or set user settings or preferences, provide information about the currently presented content (e.g., metadata), and the like.

In some implementations, in response to receiving the server media control request 112, the server system 120 forwards the server media control request 112 to the second electronic device 106-1. When received by the second electronic device 106-1, the server media control request 112 causes the second electronic device to initiate the media control operation indicated by the request. In some cases, this will include communicating with the server system 120 to perform any of the operations described above that may be requested by a media control request. In some cases, the second electronic device 106-1 will not need to establish any subsequent communication in response to receiving the server media control request 112, such as when the control request is for changing the volume, muting the speakers, changing equalizer settings, etc., as these operations can often be performed by the second electronic device 106-1 alone.

In some implementations, in response to receiving the server media control request 112, the server system 120 will perform an operation requested by the server media control request 112 without forwarding the request to the second electronic device 106-1. For example, if the server media control request 112 contains a request to initiate presentation of media content at the second electronic device 106-1, the server system 120 begins sending the media content to the second electronic device 106-1 (e.g., via the media content stream 114) without also forwarding the server media control request 112 to the second electronic device 106-1. However, even where the server system 120 executes some types of media control operations upon receiving the request from the first electronic device 102-1 (and without forwarding the request to the second electronic device 106-1), the server system 120 still forwards some types of media control requests to the second electronic device 106-1. For example, a server media control request 112 that corresponds to a request to increase or decrease speaker volume, or any other request that can only be executed by the second electronic device 106-1, are forwarded to the second electronic device 106-1, even though requests to initiate presentation of media content may not be forwarded.

In some implementations, the first electronic device 102-1 also sends a local media control request 116 directly to the second electronic device 106-1 at substantially the same time that it sends the server media control request 112 to the server system 120. In some implementations, the local media control request 116 is configured to initiate the same media control operation as the server media control request 112.

In some implementations, the local media control request 116 is sent via the local network 202 (e.g., a Local Area Network, a Personal Area Network, a peer-to-peer connection, etc.). In implementations where the local network 202 is a Local Area Network that establishes IP address space behind a traffic routing device, the local media control request 116 is sent to the second electronic device 106-1 without sending the local media control request 116 to devices that are not within the IP address space of the Local Area Network, and/or without sending the local media control request 116 through a public domain name system. Sending a local media control request 116 to the second electronic device 106-1 over the Local Area Network, in addition to sending the server media control request 112 over the Internet to the server system 120, allows for two separate, redundant pathways for delivering the media control request to the second electronic device. This can allow the second device to react more quickly and more reliably to the media control request of the first electronic device 102-1. For example, if either connection path between the first and second electronic devices is not available, is improperly configured, or the like, the other connection path can ensure that remote-control functionality is still available. Moreover, this allows a service provider (e.g., a provider of software and/or devices that are configured to present media content) to provide a robust remote control solution that reduces the necessary technical knowledge of the end user, and is more likely to work in many different communication networks and environments (e.g., where a user's internal router is not configured for internal LAN communications, where an active Internet connection does not exist, etc.).

In some implementations, the server media control request 112 and the local media control request 116 are identical. For example, they may contain the same message, such as "Device{UserX/Home Stereo}; Operation{Play: UserX/Party Mix}." Upon receiving this message, each device may respond by performing a predefined set of operations. For example, in some implementations, the server system 120 begins streaming media content associated with User X's "Party Mix" playlist to User X's Home Stereo system. Similarly, the second electronic device 106-1 (here, the home stereo system), upon receiving the same message in the local media control request 116, sends a request to the server system 120 to initiate playback of the same media content. Because multiple control requests that are configured to initiate the same media control operation are sent from the first electronic device, some implementations provide systems and methods for handling duplicate or conflicting control requests, so that media control operations are not repeated, and to ensure that new and/or different media control requests are not ignored. Some examples of this are described below with reference to FIGS. 7-8.

In some implementations, the server system 120 performs the media control request without forwarding it to the second electronic device 106-1. In this case, executing the requested operation includes streaming media content associated with User X's "Party Mix" playlist to User X's Home Stereo system. In some implementations, the server system 120 forwards the message to the second electronic device 106-1. The forwarded message may be the identical message, or it may be modified or translated before it is forwarded to the second electronic device 106-1. In implementations where the message is forwarded, it may be forwarded instead of or in addition to the server system 120 executing the requested operation. Upon receipt of the forwarded message, the second electronic device 106-1 may then send a request to the server system 120 to initiate playback of the requested content.

In some implementations, the server system 120 may be configured to initiate a media control request (e.g., streaming media to the second electronic device 106-1) only if the request originates from the device at which the media is to be presented, and not if it originates from a different device. For example, in contrast to the example above where the server system 120 begins streaming media to the second electronic device 106-1 in response to a request from the first electronic device 102-1, the server system 120 instead would only stream media to the second electronic device 106-1 if the request came directly from the second electronic device itself. In such implementations, the server 120 may be configured to forward all media control requests to the second electronic device 106-1 prior to executing them, as described above, so that the second electronic device 106-1 can determine whether, when, and how to execute the request. In some implementations, the second electronic device 106-1 (and/or the server system 120) determines the authenticity, trustworthiness, and/or origin of a media control request before it executes the request or initiates the operation.

In some implementations, the server media control request 112 and the local media control request 116 are not identical (e.g., the message is in a different form, or contains more, less, or different information), but are both configured to initiate the same media control operation by the second electronic device. For example, in some implementations, the server media control request 112 includes a command to begin delivering content to the second electronic device 106-1, while the local media control request 116 includes a command to cause the second electronic device 106-1 to issue a request to the server system 120. The request from the second electronic device 106-1 to the server system 120 in response to receiving one of the server media control request 112 and the local media control request 116 may be described as a third media control request (not shown). The form and content of the third media control request may be the same as or different from the server media control request 112 and the local media control request 116. In either case, the third media control request will be configured to cause the same media control operation as those requests. Accordingly, though these requests are configured to cause different processes to be performed by different devices (e.g., causing the server to stream media to the second electronic device, or cause the second electronic device to request that media from the server), they ultimately cause the same ultimate media control operation to be initiated (e.g., presentation of the media by the second electronic device).

As noted above, in some implementations, a media control request is configured to switch the active media presentation device from one device (e.g., a user's mobile phone) to another (e.g., a user's home stereo system). In some implementations, this includes changing the device to which the server system 120 is streaming media content. For example, a user who is listening to a music playlist on a mobile phone can request that the music be played through a home stereo system instead of (or in addition to) the mobile phone. In some implementations, the request to change media presentation devices is initiated by a user (e.g., via a user interface on the mobile phone), and in some implementations the request is initiated automatically (e.g., based on the location of the mobile phone, the proximity of the mobile phone to the home stereo system, the time of day, the day of the week, and/or user identities).

FIG. 2B also illustrates how the destination of a media content stream can be changed from one device to another in a client-server environment. In some implementations, the first electronic device 102-1 is receiving a media content stream 114-1 from the server system 120. For example, the first electronic device 102-1 may be a mobile phone receiving streaming music from the server system 120. A device within the client-server environment 100 then requests that the media also, or instead, be presented by the second electronic device 106-1. This request may come from the first and/or the second electronic device (or any other device within the environment), and may be initiated by a user, or it may be initiated automatically. For example, the user may, upon returning home, request that the music that she is listening to on the mobile phone instead by presented by the second electronic device 106-1. In some implementations, the request to change the active presentation device is sent via the local and server media control requests 116, 112. Upon receiving and/or processing a request, the server system 120 begins sending the media content stream 114-2 to the second electronic device 106-1. The media content stream 114-1 that was being sent to the first electronic device 102-1 may continue or may be terminated, depending on factors such as an explicit user request, historical usage patterns, predefined preferences, etc. In some implementations, second electronic devices 106-n buffer/cache a portion of the same media stream that is being presented by the first electronic device 102-1, so that when the second electronic device 106-n is selected to begin presentation of the media content, the second electronic device 106-n begins presenting the media content seamlessly and without interruption. Buffering and/or caching of media content is discussed in greater detail below with reference to FIGS. 6A-6B.

In some implementations, as noted above, the context of the media content stream 114-1 is available to the second electronic device 106-1 once it begins receiving the media content stream 114-2. For example, information such as the current location within a playlist, recent play history, recent changes to a playlist, etc., are all available to the second electronic device 106-1, and may be viewed, used, modified, or otherwise operated on by a user through a user interface associated with the second electronic device 106-1. In some implementations, the context information is stored in the context database 126 of the server system 120.

Also, as noted above, in some implementations, the second electronic device 106-1 buffers/caches a portion of the content that is being streamed to the first electronic device 102-1, in case the user should choose to begin media presentation by the second device instead of or in addition to the first device. In some implementations, the second electronic device 106-1 caches/buffers a predetermined portion of the media content that is being streamed to the first electronic device 102-1, such as the next 10 seconds, 20 seconds, 30 seconds, 1 minute, etc. In some embodiments, the second electronic device 106-1 receives information about the current media playback location from the first electronic device 102-1 and/or the server system 120, such that when the second electronic device 106-1 receives a command to begin presenting the media content, it begins presentation at substantially the same position as the first electronic device 102-1.

In some implementations, the server system 120, the first electronic device 102-1, and the second electronic device 106-1 are configured to present media content regardless of the particular device on which the media content is stored. For example, as described above, media content can be stored at the server system 120 (e.g., in the media content database 124), and streamed to the first and/or the second electronic devices. However, media content may also be stored at the first and/or the second electronic devices (or other storage devices accessible to the first and/or second electronic devices, such as a NAS). This media content may be made accessible for presentation by any capable device associated with a user, even though the media content may not be available from the server system 120. For example, in some implementations, a playlist on a first electronic device (e.g., a user's mobile phone) may include media content that is stored on that device's own memory, as well as media content that must be streamed from a different source, such as a remote server (e.g., server system 120) or storage device within the local network 202 (e.g., a NAS). When the user plays back the playlist at the first electronic device, that device can switch between retrieving media content from its own memory and the different source, depending on where the media content item is stored. However, if the user wished to instead playback the playlist from a second electronic device (e.g., the user's home audio system), the second electronic device may not have the same media content stored in its memory as the first electronic device. Thus, in accordance with some implementations, media content that is stored on one device in the local network 202 (e.g., on first or second electronic devices 102-*n*, 106-*n* and/or on any device within a client environment 108-*n*, such as a NAS) may be streamed to another device within the local network 202 when its turn in the playlist arrives. Accordingly, the user need not worry about where any given media content item is stored, because the media may be streamed from either remote or local sources, or both.

In some implementations, music stored locally on the first electronic device is streamed to the second electronic device via local communication paths (e.g., within a Local Area Network) when that music is not available from a remote source associated with a media content provider (e.g., the server system 120). In some implementations, music stored on a first electronic device, but not available from the media content provider, is streamed to the server associated with the media content provider, and then streamed from the server associated with the media content provider to the second electronic device. Accordingly, media that is stored on one device may be accessible to another device seamlessly and without having to download, transfer, or otherwise duplicate the media content on multiple devices. Also, this process may be seamless to the user, such that the same controls and inputs are used both for causing a second device to stream media from a remote source, and for causing locally stored media to be streamed to the second device via local communication paths.

Figure 3:
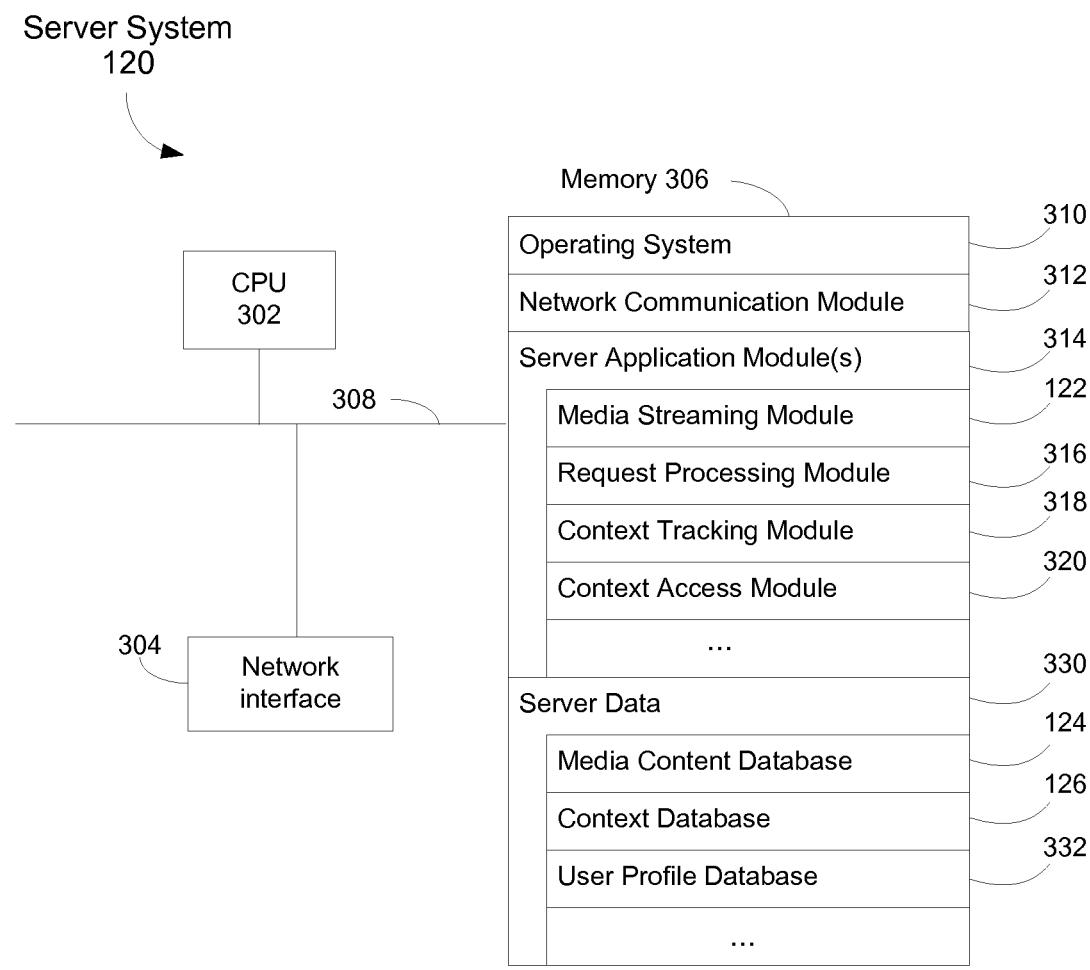
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a media streaming module 122 for streaming media content to an electronic device (e.g., first and second electronic devices 102-*n*, 106-*n*, FIG. 1) remote from the server system 120;
  - a request processing module 316 for receiving requests from electronic devices (e.g., first and/or second electronic devices 102-*n*, 106-*n*, FIG. 1), wherein the requests include requests to stream specific media content to the electronic devices and/or requests to change the destination of the media content stream (e.g., media content stream 114, FIG. 2B) from a first electronic device to a second electronic device;
  - a context tracking module 318 for tracking and storing the context of a media content stream (e.g., media content streams 114-1, 114-2, FIG. 2B), including storing, among other data, the current playback position in a media content stream that is currently being presented by an electronic device (e.g., first and/or second electronic devices 102-*n*, 106-*n*, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like;
  - a context access module 320 for allowing electronic devices (e.g., first and/or second electronic devices 102-*n*, 106-*n*, FIG. 1) associated with a given user account to access the current context for media content streams associated with the given user account; and
- one or more server data module(s) 330 for storing data related to the data server system 120, including but not limited to:
  - media content database 124 including a library of media content;
  - a context database 126 including information associated with one or more media content streams (e.g., media content streams 114-1, 114-2, FIG. 2B), wherein context information includes the current playback position in a media content stream, metadata relating to the media, a position in a playlist, play history of a user, user preferences, skipped media, and user settings; and
  - a user profile database 332 including account information for a plurality of users, each account including user media histories, lists of electronic devices associated with the user, user preferences, and determined user interests.

Figure 4:
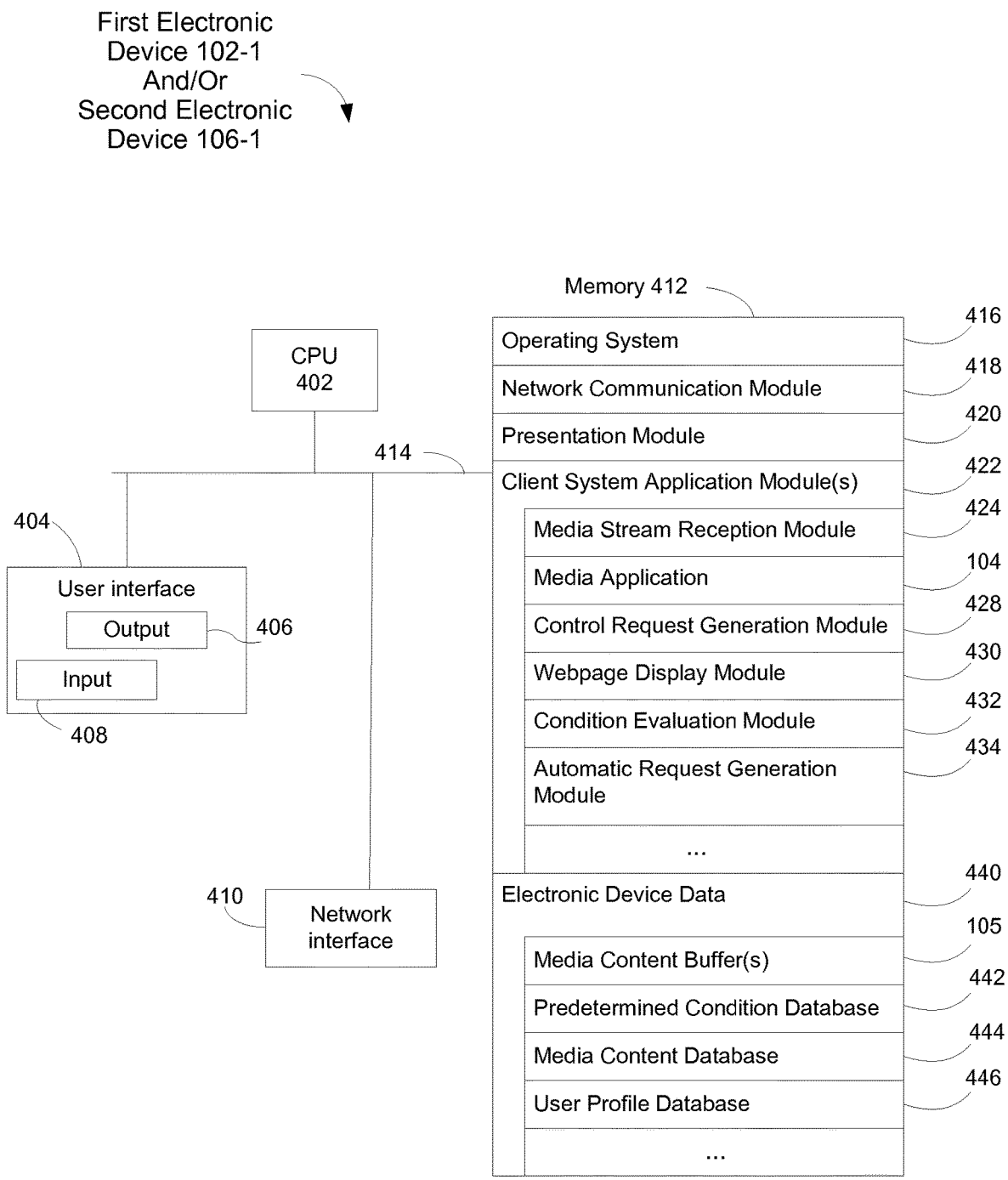
FIG. 4 is a block diagram illustrating an electronic device in accordance with some implementations.

FIG. 4 is a block diagram illustrating a first electronic device 102-1 and/or a second electronic device 106-1, in accordance with some implementations. The first electronic device 102-1 and/or the second electronic device 106-1 typically includes one or more processing units (CPUs) 402, one or more network interfaces 410, memory 412, and one or more communication buses 414 for interconnecting these components. The first electronic device 102-1 and/or the second electronic device 106-1 includes a user interface 404. The user interface 404 includes user interface elements that enable output 406 to be presented to a user, including via speakers or a visual display. The user interface 404 includes user interface components that facilitate user input 408 such as a keyboard, a mouse, a voice-command input unit, a touch sensitive display, or other input buttons 408. In some implementations, the first electronic device 102-1 and/or the second electronic device 106-1 is a wireless device, such as a mobile phone. Furthermore, some first electronic devices 102-1 and/or second electronic devices 106-1 use a microphone and voice recognition to supplement or replace the keyboard.

Memory 412 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a network communication module 418 that is used for connecting the first electronic device 102-1 and/or the second electronic device 106-1 to other computers via the one or more communication network interfaces 410 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;
- a presentation module 420 for enabling presentation of media content at the first electronic device 102-1 and/or the second electronic device 106-1 through the output mechanisms 406 associated with the user interface 404 (e.g., screens, speakers, headphones, etc.);
- one or more client system applications module(s) 422 for enabling the first electronic device 102-1 and/or the second electronic device 106-1 to perform one or more functions described herein, the application module(s) 422 including but not limited to:
  - a media stream reception module 424 for receiving (and, in some implementations, transcoding) a media content stream (e.g., media content stream 114-n, FIG. 2B) from a server system (e.g., server system 120, FIG. 2B), the media content stream including data needed to present media content at the first electronic device 102-1 and/or the second electronic device 106-1 and context data for the media content stream, wherein the media content stream can include a variety of media types including, but not limited to, audio media such as music, radio, audio books, and podcasts, video media such as internet videos, television programming, movies, digital photographs, and any other type of digitally transmissible media (e.g., games, images, advertisements, etc.);
  - a media presentation and control application 104 for presenting media content by the first electronic device 102, for controlling media presentation by other electronic devices, and for interacting with the server system 120;
  - a control request generation module 428 for, in response to user input, generating a server media control request for transmission to the server system (e.g., server media control request 112, FIG. 2B) and a local media control request for transmission to the second electronic device (e.g., local media control request 116, FIG. 2B) via a Local Area Network, VPN, BLUETOOTH, peer-to-peer, etc.;
  - a webpage display module 430 (including, e.g., a web browser) for displaying a webpage published by a third party;
  - a condition evaluation module 432 for determining whether a predetermined condition is met; in some implementations, the condition evaluation module 432 periodically determines whether any predetermined condition has been met; and
  - an automatic request generation module 434 for, in response to a determination by the condition evaluation module 432 that a predetermined condition is met, generating a request for transmission to the server system 120 without any direct user input;
- an electronic device data module 440 for storing data, including but not limited to:
  - media content buffer(s) 105 including media content data received from the server system (e.g., server system 120, FIGS. 1-3) and stored in the memory of the first electronic device 102-1 and/or the second electronic device 106-1;
  - predetermined condition database 442 including, but not limited to, one or more predetermined conditions, established by the user of the first electronic device 102, that determine whether a media control request to change the destination of the media content stream (e.g., media content stream 114-1, FIG. 2B) from the server system 120 should be automatically generated;
  - media content database 444 for storing, on the local device, media content that is part of the user's personal library of media content; and
  - a user profile database 446 including account information for a specific user of the first electronic device 102-1 and/or the second electronic device 106-1, including user media history, user preferences, determined user interests, and account credentials.

Figure 5:
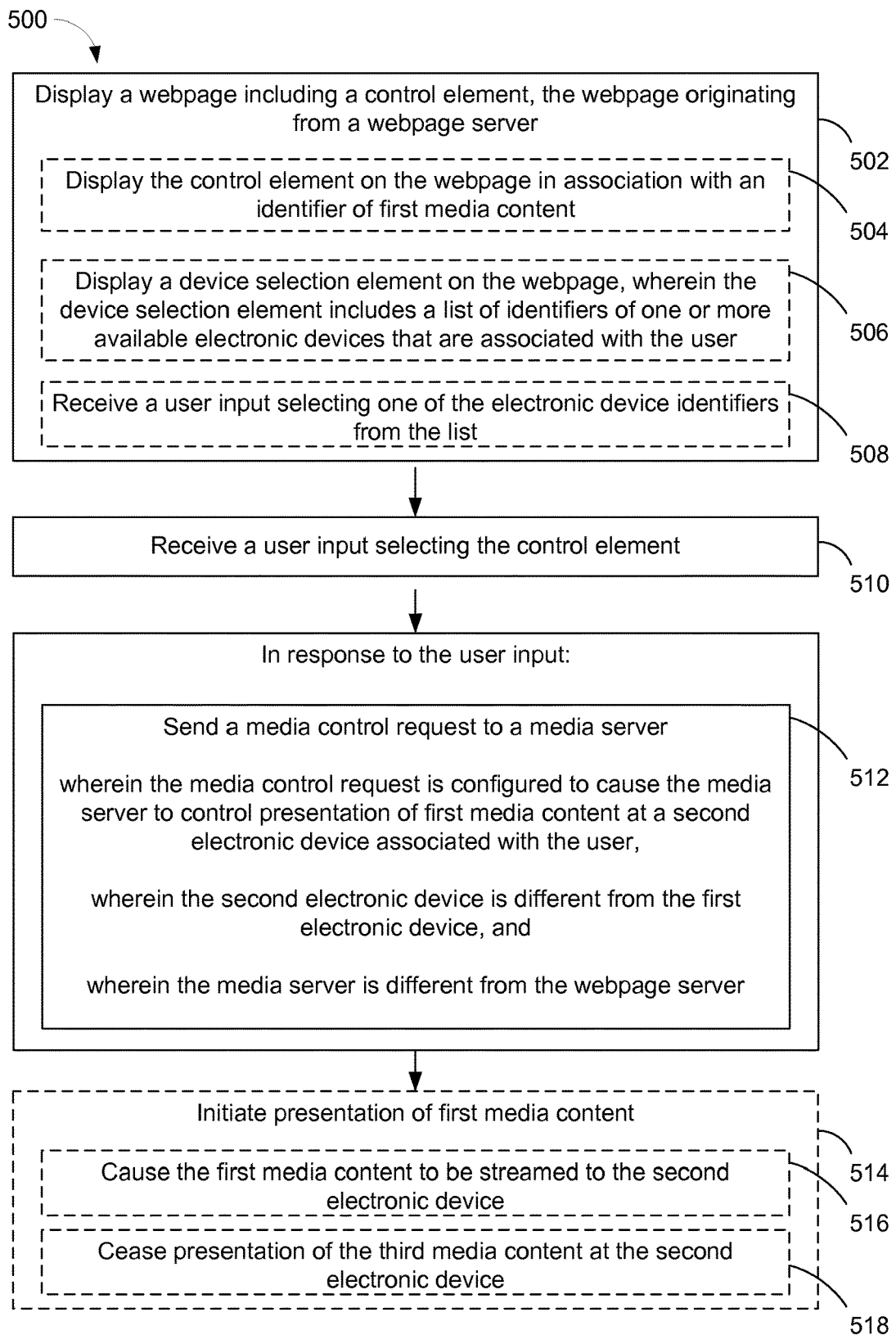
FIGS. 5-7 are flow diagrams illustrating methods of controlling media presentation, in accordance with some implementations.
Figure 6:
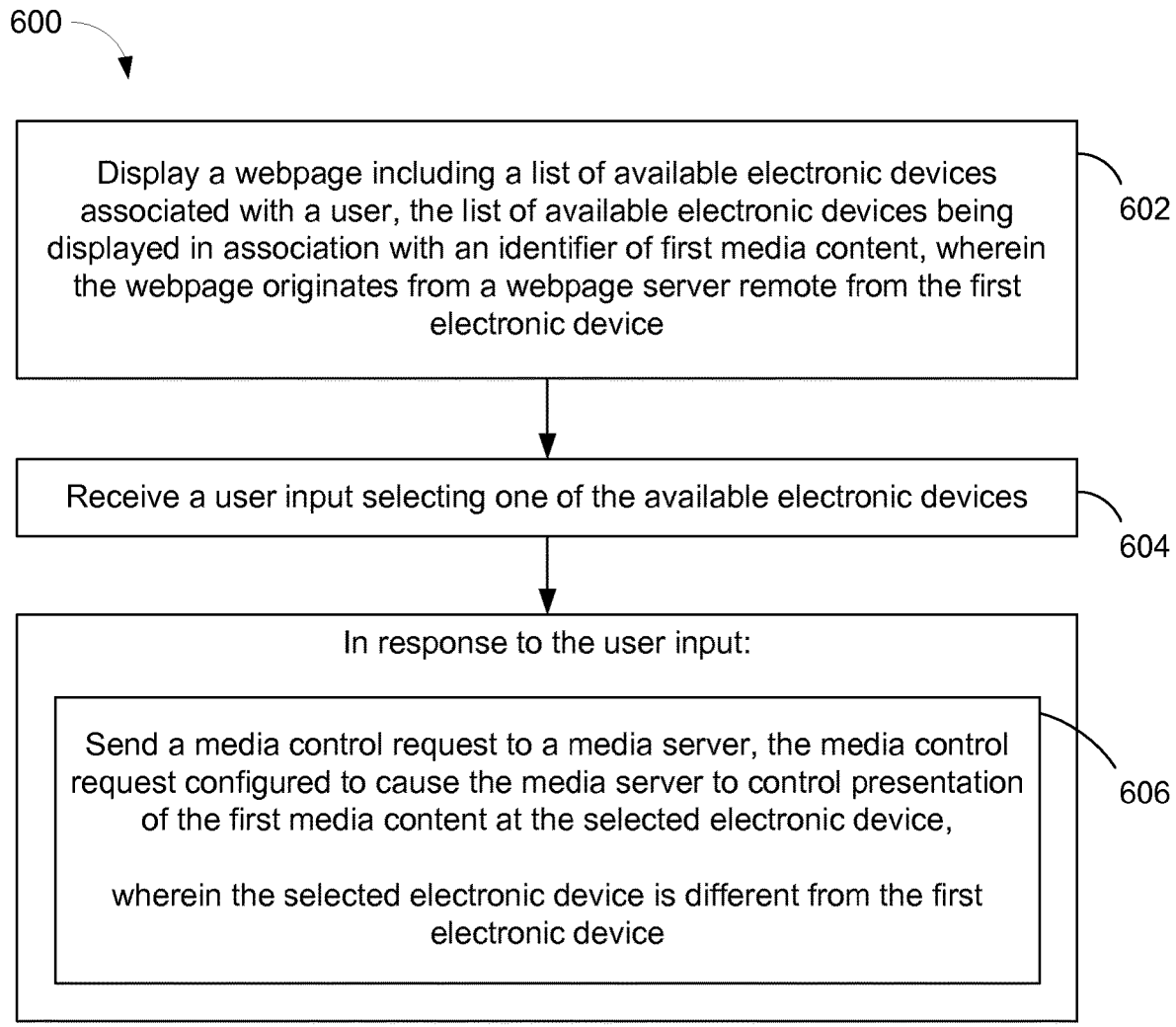
Figure 7:
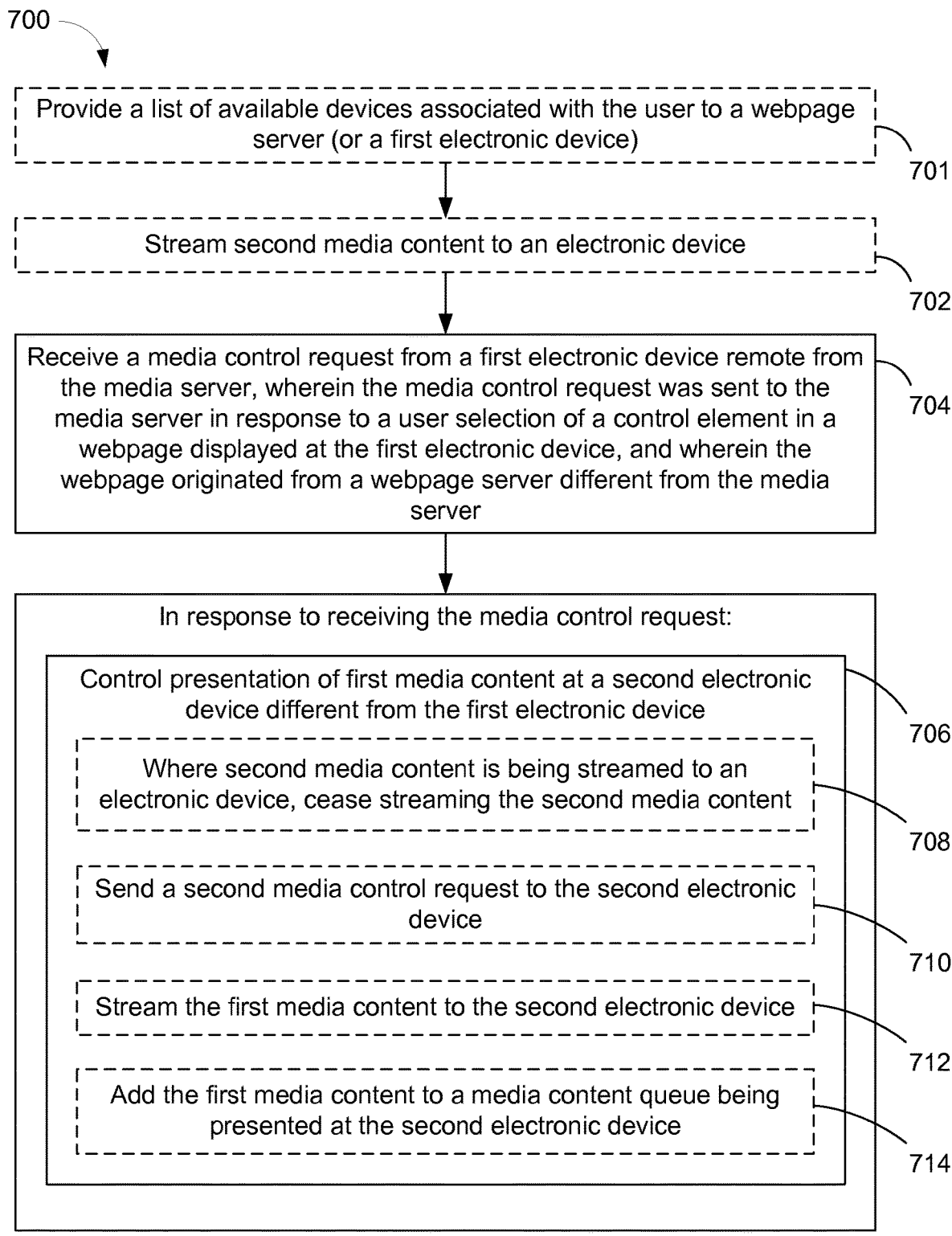

FIGS. 5-7 are flow diagrams illustrating a process of controlling media presentation at an electronic device, in accordance with some implementations. Each of the operations shown in FIGS. 5-7 may correspond to instructions stored in a computer memory or computer readable storage medium. Optional operations are indicated by dashed lines (e.g., boxes with dashed-line borders).

With reference to FIG. 5, in some implementations, the method 500 is performed at a first electronic device having one or more processors and memory storing one or more programs for execution by the one or more processors (e.g., the first electronic device 102-1, discussed above). In some implementations, the first electronic device is a computer. In some implementations, the first electronic device is a personal computer, a mobile electronic device, a laptop, a tablet computer, a mobile phone, a digital media player, or any other appropriate electronic device.

The first electronic device displays a webpage including a control element, the webpage originating from a webpage server (502) (e.g., webpage server 130, FIG. 2A). In some implementations, the first electronic device displays the webpage in a web browser application. In some implementations, the first electronic device displays the webpage in an application that is not principally a web browser, such as an application that is designed primarily to provide access to web-based content from a single information source (or a limited number of information sources). In some implementations, the webpage is or includes one or more web-based information items that are received from the webpage server, such as HTML documents, responses to web API calls, and the like. In some implementations, the webpage is received from the webpage server via the Internet. In some implementations, the webpage is displayed on a display device (e.g., an LCD, a touchscreen, etc.) associated with the first electronic device.

In some implementations, the control element is displayed on the webpage in association with an identifier of first media content (504). In some implementations, the identifier is an image, photograph, text, icon, or other information that identifies the media content, and may be a description, title (e.g., album title, track name, movie title, television series/episode title, etc.), author, artist, actor name, and the like. In some implementations, the identifier and the control element are presented so that it is apparent that the control element relates to the identified media content. For example, a play button may be presented below a title of a song and/or album art from the album on which a song was released.

In some implementations, the first electronic device displays a device selection element on the webpage, wherein the device selection element includes a list of identifiers of one or more available electronic devices that are associated with a user (506). In some implementations, the first electronic device receives a user input selecting one of the electronic device identifiers from the list (508). In some implementations, the media control request (discussed below) identifies the selected electronic device. (In some implementations, the second electronic device discussed below with reference to step (512) is the device selected by the user in step (508)).

The first electronic device receives a user input selecting the control element (510). In some implementations, the user input corresponds to the user clicking, touching, pressing, swiping, pinching, or otherwise interacting with and/or activating the control element.

In response to the user input, the first electronic device sends a media control request to a media server (512) (e.g., server system 120, FIGS. 1-3), wherein the media control request is configured to cause the media server to control presentation of first media content at a second electronic device associated with the user, wherein the second electronic device is different from the first electronic device, and wherein the media server is different from the webpage server. FIG. 2A illustrates one example of a client/server environment with first and second electronic devices that are different from one another, and a webpage server and a media server (e.g., the server system 120) that are different from one another. In some implementations, controlling presentation of the media content includes initiating presentation of the first media content, as discussed below with respect to step (514). In some implementations, controlling presentation of the media content includes adding the first media content to a media content queue being presented at the second electronic device (or a media queue that is not currently being presented). In some implementations, the first media content is an audio track, a video, an audio playlist, a video playlist, or the like.

In some implementations, the second electronic device is one of a plurality of electronic devices associated with the user. For example, in some implementations, a second electronic device is any of a computer, a mobile phone, a remote control device, a portable media player, a television, a home media receiver, a home audio/visual system (or component(s) thereof), or a speaker. In some implementations, the second electronic device is a default device at which media content is to be presented. For example, if a user selects a "play" control element in the webpage, the method may initiate presentation of media content at the default second electronic device. In some implementations, a user may select the particular electronic device at which the first media content is to be presented.

In some implementations, controlling presentation of first media content includes initiating presentation of the first media content (514). The first electronic device may initiate presentation of the first media content, for example, by sending a media control request that is configured to cause the media server to take actions that result in the presentation of the first media content at the second electronic device. For example, if a user selects a "play" control corresponding to first media content (e.g., a song, video, etc.), the media server may stream the first media content to the second electronic device, and/or communicate with the second electronic device in order to cause that device to request the first media content from the media server and/or other servers or sources.

In some implementations, initiating presentation of the first media content includes causing the first media content to be streamed to the second electronic device (516). In some implementations, the first media content is streamed to the second device from the media server. For example, as noted above, the media control request sent to the media server at step (512) may be configured to cause the media server to stream the first media content to the second electronic device. In some implementations, the first media content is streamed to the second device from a client device remote from the first electronic device. For example, the media control request sent to the media server may be configured to cause the media server to identify a secondary server, client device (e.g., from a different client environment), or other source, that can stream the first media content to the second device. The media server, in turn, may communicate with the secondary server, client device, or other source to request that it stream the first media content to the first electronic device. Alternatively, the media server may cause the first electronic device to identify and/or communicate with a secondary server, client device, or other source from which to stream the first media content.

In some cases, the method 500 may be performed while the second electronic device is presenting third media content. In some such implementations, initiating presentation of first media content includes ceasing presentation of the third media content at the second electronic device prior to (or concurrently with) initiating presentation of the first media content (518).

In some cases, the method 500 is performed while a third electronic device is presenting media content. In some such implementations, initiating presentation of first media content includes ceasing presentation of the media content at the third electronic device prior to (or concurrently with or shortly after) initiating presentation of the first media content at the second electronic device at step (514).

With reference to FIG. 6, in some implementations, the method 600 is performed at a first electronic device having one or more processors and memory storing one or more programs for execution by the one or more processors (e.g., the first electronic device 102-1, discussed above).

The first electronic device displays a webpage including a list of available electronic devices associated with a user, the list of available electronic devices being displayed in association with an identifier of first media content, wherein the webpage originates from a webpage server remote from the first electronic device (602). In some implementations, the list of electronic devices includes identifiers of electronic devices that are capable of presenting media content in response to a selection of a media control in the displayed webpage. In some implementations, the list of available electronic devices shows only a subset of the electronic devices that are associated with a user. In some implementations, the subset of electronic devices includes those devices that are online (i.e., capable of communication with the first electronic device and/or other computers or electronic devices) and/or capable of receiving media control requests related to media presentation. In some implementations, the list is presented in a dropdown menu, context menu, textual list, or the like.

The first electronic device receives a user input selecting one of the available electronic devices (604). For example, a user selects one of the available electronic devices by clicking, touching, pressing, swiping, pinching, or otherwise selecting an icon, name, or other indicator of an available electronic device.

In response to the input, the first electronic device sends a media control request to a media server, the media control request configured to cause the media server to control presentation of the first media content at the selected electronic device, wherein the selected electronic device is different from the first electronic device (606). Controlling presentation of media content is discussed above with respect to FIG. 5, and the same and/or similar steps may be implemented in conjunction with method 600.

With reference to FIG. 7, in some implementations, the method 700 is performed at a media server having one or more processors and memory storing one or more programs for execution by the one or more processors (e.g., the server system 120, discussed above).

The media server receives a media control request from a first electronic device remote from the media server, wherein the media control request was sent to the media server in response to a user selection of a control element in a webpage displayed at the first electronic device, and wherein the webpage originated from a webpage server different from the media server (704). For example, a user may select a control element, such as a play button or icon, in a webpage originating from a webpage server, causing the user's computer to send the media control request to the media server. In some implementations, the first electronic device is a laptop computer, tablet computer, smartphone, or the like. In some implementations, the webpage is associated with a social network account of the user.

In response to receiving the media control request, the media server controls presentation of first media content at a second electronic device different from the first electronic device (706). As noted in step (704), the first electronic device corresponds to a device that displays a webpage that includes one or more selectable control elements. Thus, if a user selects a control element displayed in a web browser of a laptop computer (e.g., a "first electronic device"), for example, the media server controls presentation of first media content at a second electronic device, such as a smart phone, a different computer, a home stereo system, etc. In some implementations, the media server selects as the second electronic device a default electronic device from a list of available electronic devices associated with the user. Thus, when a user selects a control element to control presentation of first media content without otherwise specifying what electronic device should be controlled, the media server will select a default device. In some implementations, the default device is selected by the user, such as during an initialization of an account with a content provider. In some implementations, the default device is selected by the media server based on one or more heuristics, rules, and/or decisions. For example, the default device may be determined to be the most frequently used device (e.g., if the user usually listens to music on her smartphone, the smartphone may be determined to be the default device), the most recently used device, the nearest device (e.g., as determined by GPS, cell-tower triangulation, near-field communications, BLUETOOTH, etc.), a device with appropriate functionality for the selected media content (e.g., a video playing device if the media content is a video), a device that is not currently in use, a device that is on and/or accessible at that time, etc.

In some implementations, controlling presentation of first media content (706) includes sending a second media control request to the second electronic device (710). For example, the media server receives the first media control request from the first electronic device, and then sends a second media control request to the second electronic device, where the second media control request is configured to cause the second electronic device to cause a media control operation. As a specific example, in response to a user input from a laptop computer selecting playback of a song at a home audio system, the media server will send a media control request to the home audio system that causes it to take the necessary actions to begin playback of that song.

In some implementations, controlling presentation of first media content (706) includes streaming the first media content to the second electronic device (712). For example, in response to a user input from a laptop computer selecting playback of a song at a home audio system, the media server will stream the song (the first media content) to the home audio system.

In some implementations, controlling presentation of first media content (706) includes adding the first media content to a media content queue (e.g., a playlist) being presented at the second electronic device (714) (or a media content queue that is not currently being presented). In some implementations, adding the first media content to the media content queue includes adding the first media content to the end of the media content queue. In some implementations, adding the first media content to the media content queue includes adding the first media content as a next media content item in the media content queue. In some implementations, adding the first media content to the media content queue includes adding the first media content to the beginning of the queue, or any other desired location in the queue.

In some implementations, prior to receiving the media control request, the media server provides a list of available devices associated with the user to the webpage server (701). (In some implementations, the media server provides a list of available devices associated with the user to the first electronic device.) In some implementations, the list of available devices (or information derived from or included in the list) is presented to the user via the webpage to enable selection of the device that the user wants to control in response to the selection of the control element. In some implementations, the list of available devices (or information derived from or included in the list) is used to populate a drop down menu, context menu, or other type of list of available devices that can be displayed in a webpage in association with one or more control elements. In some implementations, the list of available devices includes only those devices that can present the type of content requested by the media control request. For example, if a media control request is to initiate playback of a song, only devices that can playback audio will be shown. If the media control request is to initiate playback of a video, only device that can playback video will be shown.

In some implementations, prior to receiving the media control request, the media server streams second media content to an electronic device (702). In some implementations, the second media content is being streamed to the second electronic device. For example, before a user selects a control in a webpage displayed on a laptop computer (the first electronic device), the user's smartphone (the second electronic device) may be streaming music. In some implementations, the second media content is being streamed to a third electronic device separate from the first and the second electronic devices. For example, the user may select a control in a webpage displayed on a laptop computer (the first electronic device) in order to initiate presentation of music at a smartphone (the second electronic device) while music is being streamed to a user's home stereo system (the third electronic device).

In some implementations where second media content is being streamed to an electronic device when the media server receives the media control request from the first electronic device (702), the streaming of the second media content is ceased (708) prior to streaming the first media content to the second electronic device (712) or sending the second media control request to the second electronic device (710). For example, if the song "Free Bird" is being streamed to a home audio system when a user selects a control element to initiate playback of "Stairway to Heaven" (either at the home audio system or another playback device associated with the user), the stream of "Free Bird" will be ceased before the playback of "Stairway to Heaven" is initiated.

The methods illustrated in FIGS. 5-7 may be governed by instructions that are stored in a computer readable storage medium and that are executed by at least one processor of at least one server. Each of the operations shown in FIGS. 5-7 may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for controlling media presentation, performed at a first electronic device associated with a user and having one or more processors and memory storing one or more programs for execution by the one or more processors, the method comprising:

displaying a webpage including a first control element associated with an identifier of first media content provided by a media server, the webpage originating from a webpage server distinct from the media server;

receiving a first user input selecting the first control element; and in response to the user input:

sending a first media control request to the media server, the first media control request configured to cause the media server to perform a media control operation to control presentation of the first media content from the media server at a second electronic device associated with the user, wherein:

the first media control request includes an instruction that is modified by the media server before the instruction is forwarded to the second electronic device;

the second electronic device is different from the first electronic device;

the media server is connected to the webpage server through the Internet;

the webpage server is associated with a first service provider; and the media server is associated with a second service provider distinct from the first service provider; and sending, to the second electronic device, a local media control request via a local network, wherein the local media control request is configured to perform the media control operation of the first media control request.

2. The method of claim 1, wherein controlling presentation of first media content includes initiating presentation of the first media content.

3. The method of claim 1, wherein the first media content is selected from the group consisting of: an audio track; a video; an audio playlist; and a video playlist.

4. The method of claim 1, further comprising receiving the first user input while the media server is streaming second media content to a third electronic device associated with the user.

5. The method of claim 1, the displaying including displaying the webpage in a web browser application.

6. The method of claim 1, wherein the webpage is received from the webpage server via the Internet.

7. The method of claim 1, wherein the first electronic device is a computer.

8. The method of claim 1, wherein the second electronic device is selected from the group consisting of: a computer; a mobile phone; a remote control device; a portable media player; a television; a home media receiver; a home audio/visual system; and a speaker.

9. The method of claim 1, wherein controlling presentation of the first media content includes adding the first media content to a media content queue being presented at the second electronic device.

10. The method of claim 2, wherein initiating presentation of the first media content includes causing the first media content to be streamed to the second electronic device.

11. The method of claim 10, wherein the first media content is streamed to the second device from the media server.

12. The method of claim 10, wherein the first media content is streamed to the second device from a client device remote from the first electronic device.

13. The method of claim 2, wherein the second electronic device is presenting third media content when the first user input is received, the initiating presentation of the first media content including ceasing presentation of the third media content at the second electronic device.

14. The method of claim 1, displaying the webpage further comprising:

displaying a device selection element on the webpage, wherein the device selection element includes a list of identifiers of one or more available electronic devices that are associated with the user; wherein:

the first user input selects one of the electronic device identifiers from the list; and the first media control request identifies the selected electronic device.

15. The method of claim 14, wherein the selected electronic device is the second electronic device.

16. The method of claim 1, wherein the media server is associated with a media content provider, and the webpage server is associated with a social network provider.

17. The method of claim 1, wherein the second electronic device is one of a plurality of electronic devices associated with the user, and wherein the second electronic device is a default device at which media content is to be presented.

18. A method for controlling media presentation, performed at a media server having one or more processors and memory storing one or more programs for execution by the one or more processors, the method comprising:

receiving a first media control request from a first electronic device remote from the media server, wherein:

the first media control request was sent to the media server in response to a first user selection of a first control element in a webpage displayed at the first electronic device, the first control element is associated with an identifier of first media content provided by the media server, the first media control request is configured to cause the media server to perform a media control operation to control presentation of the first media content at a second electronic device, and the first media control request includes an instruction that is modified by the media server before the instruction is forwarded to the second electronic device, and a local media control request was sent, via a local network, to the second electronic device, wherein the local media control request is configured to perform the media control operation of the first media control request;

the webpage originated from a webpage server different from the media server;

the media server is connected to the webpage server through the Internet;

the webpage server is associated with a first service provider; and the media server is associated with a second service provider distinct from the first service provider; and in response to receiving the first media control request, controlling presentation of the first media content from the media server at the second electronic device different from the first electronic device.

19. The method of claim 18, wherein controlling presentation of first media content includes performing at least one of sending a second media control request or streaming the first media content to the second electronic device.

20. The method of claim 18, wherein controlling presentation of first media content includes adding the first media content to a media content queue being presented at the second electronic device.

21. The method of claim 20, wherein adding the first media content to the media content queue includes adding the first media content to the end of the media content queue.

22. The method of claim 20, wherein adding the first media content to the media content queue includes adding the first media content as a next media content item in the media content queue.

23. The method of claim 19, further comprising:
prior to receiving the first media control request from the first electronic device, streaming second media content to a third electronic device separate from the first and the second electronic devices; and
in response to receiving the first media control request:
ceasing streaming the second media content to the third electronic device; and
streaming the first media content to the second electronic device.

24. The method of claim 19, further comprising:
prior to receiving the first media control request from the first electronic device, streaming second media content to the second electronic device; and
in response to receiving the first media control request:
ceasing streaming the second media content to the second electronic device; and
streaming the first media content to the second electronic device.

25. The method of claim 18, further comprising, in response to receiving the first media control request, selecting a default electronic device from a list of available electronic devices associated with the user, wherein the second electronic device is the default electronic device.

26. The method of claim 18, wherein the webpage is associated with a social network account of the user.

27. The method of claim 18, further comprising:
prior to receiving the first media control request from the first electronic device, providing a list of available devices associated with the user to the webpage server.

28. The method of claim 18, further comprising:
prior to receiving the first media control request from the first electronic device, providing a list of available devices associated with the user to the first electronic device.

29. The method of claim 18, wherein the first media content is selected from the group consisting of: an audio track; a video; an audio playlist; and a video playlist.

30. The method of claim 1, wherein the first control element is downloaded from the media server.

31. The method of claim 1, wherein the webpage includes a second control element, the method further comprising:
receiving a second user input selecting the second control element; and
in response to the second user input, sending a second media control request to the media server, wherein the second media control request includes an instruction that is not to be forwarded to the second electronic device.

32. The method of claim 31, wherein the instruction, included in the second media control request, that is not to be forwarded to the second electronic device comprises an instruction to initiate presentation of the first media content at the second electronic device.

33. The method of claim 1, wherein the instruction, included in the first media control request, that is modified by the media server before the instruction is forwarded to the second electronic device comprises an instruction to control a volume at the second electronic device.

* * * * *